US012611651B2

(12) United States Patent
Anyanwu et al.

(10) Patent No.: US 12,611,651 B2
(45) Date of Patent: Apr. 28, 2026

(54) AMINE GRAFTED SILICA GELS

(71) Applicant: The Regents of the University of Michigan, Ann Arbor, MI (US)

(72) Inventors: John-Timothy Anyanwu, Ann Arbor, MI (US); Yiren Wang, Ann Arbor, MI (US); Ralph T. Yang, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 473 days.

(21) Appl. No.: 17/150,376

(22) Filed: Jan. 15, 2021

(65) Prior Publication Data

US 2021/0213419 A1 Jul. 15, 2021

Related U.S. Application Data

(60) Provisional application No. 62/961,450, filed on Jan. 15, 2020.

(51) Int. Cl.
*B01J 20/283* (2006.01)
*B01D 53/02* (2006.01)
*B01J 20/32* (2006.01)

(52) U.S. Cl.
CPC ............ *B01J 20/283* (2013.01); *B01D 53/02* (2013.01); *B01J 20/3259* (2013.01)

(58) Field of Classification Search
CPC ...... B01J 20/283; B01J 20/3259; B01D 53/02
USPC ....................................... 502/407
See application file for complete search history.

(56) References Cited

PUBLICATIONS

Qiao et al., "High density silanization of nano-silica particles using-aminopropyltriethoxysilane (APTES)", Applied Surface Science 351 (2015) 646-654. (Year: 2015).*
Nik et al., "Amionosilanes grafting on FAU/EMT zeolite: Effect on CO2 adsorptive properties", Microporous and Mesoporous Materials 143 (2011) 221-229. (Year: 2011).*
Ji et al., "Organosilane grafted silica: Quantitative correlation of microscopic surface characters and macroscopic surface properties ", Applied Surface Science 399 (2017) 565-572. (Year: 2017).*
Hector Ivan Melendez-Ortiz et al., "Functionalization with amine-containing organosilane of mesoporous silica MCM-41 and MCM-48 obtained at room temperature", Ceramics International 40 (2014) 9701-9707. (Year: 2014).*
Anyanwu, J. T.; Wang, Y.; Yang, R. T.; Amine-Grafted Silica Gels for CO2 Capture Including Direct Air Capture; Ind. Eng. Chem. Res. 2020, vol. 59, pp. 7072-7079; https://doi.org/10.1021/acs.iecr. 9b05228.
Arkles, B.; Steinmetz, J. R.; Zazyczny, J.; Mehta, P.; Factors Contributing to the Stability of Alkoxysilanes in Aqueous Solution; J. Adhes. Sci. Technol. 1992, vol. 6 (1), pp. 193-206; https://doi.org/10.1163/156856192X00133.
Assink, R. A.; Kay, B. D.; Sol-Gel Kinetics I. Functional Group Kinetics; Journal of Non-Crystalline Solids; 1988; vol. 99, pp. 359-370; https://doi.org/doi.org/10.1016/0022-3093(88)90441-3.

(Continued)

*Primary Examiner* — Anita Nassiri-Motlagh
(74) *Attorney, Agent, or Firm* — Lempia Summerfield Katz LLC

(57) ABSTRACT

A method of grafting a silica support includes adding the silica support to a solvent, resulting in a first solution, adding an amount of silane to the first solution, resulting in a second solution, filtering grafted silica support from the second solution, and drying the grafted silica support.

12 Claims, 23 Drawing Sheets

US 12,611,651 B2

Page 2

(56)                 References Cited

PUBLICATIONS

Bacsik, Z. et al.; Mechanisms and Kinetics for Sorption of CO2 on Bicontinuous Mesoporous Silica Modified with N Propylamine; Langmuir 2011, vol. 27 (17), pp. 11118-11128; https://doi.org/10.1021/la202033p.

Bernards, T. N. M.; Janssen, M. J. C. H.; Van Bommel, M. J.; Influence of Butanol on the Hydrolysis-Condensation Behaviour of Teos; J. Non. Cryst. Solids 1994, vol. 168, pp. 201-212.

Chang, A. C. C.; Chuang, S. S. C.; Gray, M.; Soong, Y.; In-Situ Infrared Study of CO2 Adsorption on SBA-15 Grafted with γ-(Aminopropyl)Triethoxysilane; Energy and Fuels 2003, vol. 17 (2), pp. 468-473; https://doi.org/10.1021/ef020176h.

Chen, C. H. et al.; The "Missing" Bicarbonate in CO2 Chemisorption Reactions on Solid Amine Sorbents; J. Am. Chem. Soc. 2018, vol. 140 (28), pp. 8648-8651; https://doi.org/10.1021/jacs.8b04520.

Choi, S.; Drese, J. H.; Eisenberger, P. M.; Jones, C. W.; Application of Amine-Tethered Solid Sorbents for Direct CO2 Capture from the Ambient Air; Environ. Sci. Technol. 2011, vol. 45 (6), pp. 2420-2427; https://doi.org/10.1021/es102797w.

Darunte, L. A. et al.; Moving beyond Adsorption Capacity in Design of Adsorbents for CO2 Capture from Ultradilute Feeds: Kinetics of CO2 Adsorption in Materials with Stepped Isotherms; Ind. Eng. Chem. Res. 2019, vol. 58 (1), pp. 366-377; https://doi.org/10.1021/acs.iecr.8b0504.

Darunte, L. A.; Oetomo, A. D.; Walton, K. S.; Sholl, D. S.; Jones, C. W.; Direct Air Capture of CO2 Using Amine Functionalized MIL-101(Cr); ACS Sustain. Chem. Eng. 2016, vol. 4 (10), pp. 5761-5768; https://doi.org/10.1021/acssuschemeng.6b01692.

Darunte, L. A.; Walton, K. S.; Sholl, D. S.; Jones, C. W.; CO2 Capture via Adsorption in Amine-Functionalized Sorbents; Curr. Opin. Chem. Eng. 2016, vol. 12, pp. 82-90; https://doi.org/10.1016/j.coche.2016.03.002.

Didas, S. A.; Sakwa-Novak, M. A.; Foo, G. S.; Sievers, C.; Jones, C. W.; Effect of Amine Surface Coverage on the Co-Adsorption of CO2 and Water: Spectral Deconvolution of Adsorbed Species; J. Phys. Chem. Lett. 2014, vol. 5 (23), pp. 4194-4200; https://doi.org/10.1021/jz502032c.

Drese, J. H. et al.; Synthesis Structure-Property Relationships for Hyperbranched Aminosilica CO2 Adsorbents; Adv. Funct. Mater. 2009, vol. 19 (23), pp. 3821-3832; https://doi.org/10.1002/adfm.200901461.

Epiepang, F. E.; Li, J.; Liu, Y.; Yang, R. T.; Low-Pressure Performance Evaluation of CO2, H2O and CH4 on Li-LSX as a Superior Adsorbent for Air Prepurification; Chem. Eng. Sci. 2016, vol. 147, pp. 100-108; https://doi.org/10.1016/j.ces.2016.03.022.

Fan, Y.; Labreche, Y.; Lively, R. P.; Jones, C. W.; Koros, W. J.; Dynamic CO2 Adsorption Performance of Internally Cooled Silica-Supported Poly(Ethylenimine) Hollow Fiber Sorbents; AIChE J. 2014, vol. 60 (11), pp. 3878-3887; https://doi.org/10.1002/aic.14615.

Fan, Y.; Rezaei, F.; Labreche, Y.; Lively, R. P.; Koros, W. J.; Jones, C. W.; Stability of Amine-Based Hollow Fiber CO2 Adsorbents in the Presence of NO and SO2; Fuel 2015, vol. 160, pp. 153-164; https://doi.org/10.1016/j.fuel.2015.07.072.

Feng, X.; Fryxell, G. E.; Wang, L. Q.; Kim, A. Y.; Liu, J.; Kemner, K. M.; Functionalized Monolayers on Ordered Mesoporous Supports; Science 1997, vol. 276 (5314), pp. 923-926; https://doi.org/10.1126/science.276.5314.923.

Franchi, R. S.; Harlick, P. J. E.; Sayari, A.; Applications of Pore-Expanded Mesoporous Silica. 2. Development of a High-Capacity, Water-Tolerant Adsorbent for CO2; Ind. Eng. Chem. Res. 2005, vol. 44 (21), pp. 8007-8013; https://doi.org/10.1021/ie0504194.

Functionalization, aerogel.org; 2012; 4 pp; http://www.aerogel.org/?p=1918.

Gartmann, N.; Schutze, C.; Ritter, H.; Brühwiler, D.; The Effect of Water on the Functionalization of Mesoporous Silica with 3-Aminopropyltriethoxysilane; J. Phys. Chem. Lett. 2010; vol. 1, pp. 379-382; https://doi.org/10.1021/jz9002795.

Gelles, T.; Rezaei, F.; Diffusion Kinetics of CO2 in Amine-Impregnated MIL-101, Alumina, and Silica Adsorbents; AIChE J. 2020, vol. 66 (1), 15 pp; https://doi.org/10.1002/aic.16785.

Harlick, p. J. E.; Sayari, A.; Applications of Pore-Expanded Mesoporous Silica. 5. Triamine Grafted Material with Exceptional CO2 Dynamic and Equilibrium Adsorption Performance; Ind. Eng. Chem. Res. 2007, vol. 46 (2), pp. 446-458; https://doi.org/10.1021/ie060774+.

Heydari-Gorji, A.; Belmabkhout, Y.; Sayari, A.; Polyethylenimine-Impregnated Mesoporous Silica: Effect of Amine Loading and Surface Alkyl Chains on CO2 Adsorption; Langmuir 2011, vol. 27 (20), pp. 12411-12416; https://doi.org/10.1021/la202972t.

Hicks, J. C.; Drese, J. H.; Fauth, D. J.; Gray, M. L.; Qi, G.; Jones, C. W.; Designing Adsorbents for CO2 Capture from Flue Gas-Hyperbranched Aminosilicas Capable of Capturing CO2 Reversibly; J. Am. Chem. Soc. 2008, vol. 130 (10), pp. 2902-2903; https://doi.org/10.1021/ja077795v.

Hitz, S.; Prins, R.; Influence of Template Extraction on Structure, Activity, and Stability of MCM-41 Catalysts; J. Catal. 1997, vol. 168, pp. 194-206.

Hiyoshi, N.; Yogo, K.; Yashima, T.; Adsorption of Carbon Dioxide on Amine Modified SBA-15 in the Presence of Water Vapor; Chem. Lett. 2004, vol. 33 (5), pp. 510-511; https://doi.org/10.1246/cl.2004.510.

Huang, H. Y.; Yang, R. T.; Chinn, D.; Munson, C. L.; Amine-Grafted MCM-48 and Silica Xerogel as Superior Sorbents for Acidic Gas Removal from Natural Gas; Ind. Eng. Chem. Res. 2003, vol. 42 (12), pp. 2427-2433; https://doi.org/10.1021/ie020440u.

Huang, K.; Quan, X.; Li, X.; Tezel, F. H.; Li, B.; Improved Surface Hydrophilicity and Antifouling Property of Nanofiltration Membrane by Grafting NH2-Functionalized Silica Nanoparticles; Polym. Adv. Technol.; 2018, vol. 29; 12 pp; https://doi.org/10.1002/pat.4438.

Jahandar Lashaki, M.; Sayari, A.; CO2 Capture Using Triamine-Grafted SBA-15: The Impact of the Support Pore Structure; Chem. Eng. J. 2018, vol. 334, pp. 1260-1269; https://doi.org/10.1016/j.cej.2017.10.103.

Kalyanaraman, J. et al.; Modeling and Experimental Validation of Carbon Dioxide Sorption on Hollow Fibers Loaded with Silica-Supported Poly(Ethylenimine); Chem. Eng. J. 2015, vol. 259, pp. 737-751; https://doi.org/10.1016/j.cej.2014.08.023.

Kim, S.; Ida, J.; Guliants, V. V.; Lin, J. Y. S.; Tailoring Pore Properties of MCM-48 Silica for Selective Adsorption of CO2; J. Phys. Chem. B 2005, vol. 109 (13), pp. 6287-6293; https://doi.org/10.1021/jp045634x.

Kim, T. W.; Kleitz, F.; Paul, B.; Ryoo, R.; MCM-48-like Large Mesoporous Silicas with Tailored Pore Structure: Facile Synthesis Domain in a Ternary Triblock Copolymer-Butanol-Water System; J. Am. Chem. Soc. 2005, vol. 127 (20), pp. 7601-7610; https://doi.org/10.1021/ja042601m.

Kishor, R.; Ghoshal, A. K.; APTES Grafted Ordered Mesoporous Silica KIT-6 for CO2 adsorption; Chem. Eng. J. 2015, vol. 262, pp. 882-890; https://doi.org/10.1016/j.cej.2014.10.039.

Kleitz, F.; Choi, S. H.; Ryoo, R.; Cubic Ia3d Large Mesoporous Silica: Synthesis and Replication to Platinum Nanowires, Carbon Nanorods and Carbon Nanotubes; Chem. Commun. 2003, vol. 3 (17), pp. 2136-2137; https://doi.org/10.1039/b306504a.

Kruk, M.; Jaroniec, M.; Sayari, A.; Application of Large Pore MCM-41 Molecular Sieves to Improve Pore Size Analysis Using Nitrogen Adsorption Measurements; Langmuir 1997, vol. 13 (23), pp. 6267-6273.

Kwon, H. T.; Sakwa-Novak, M. A.; Pang, S. H.; Sujan, A. R.; Ping, E. W.; Jones, C. W.; Aminopolymer-Impregnated Hierarchical Silica Structures: Unexpected Equivalent CO2 Uptake under Simulated Air Capture and Flue Gas Capture Conditions; Chem. Mater. 2019, vol. 31 (14), pp. 5229-5237; https://doi.org/10.1021/acs.chemmater.9b01474.

Labreche, Y.; Fan, Y.; Rezaei, F.; Lively, R. P.; Jones, C. W.; Koros, W. J.; Poly(Amide-Imide)/Silica Supported PEI Hollow Fiber Sorbents for Postcombustion CO2 Capture by RTSA; ACS Appl. Mater. Interfaces 2014, vol. 6 (21), pp. 19336-19346; https://doi.org/10.1021/am505419w.

Leal, O.; Bolivar, C.; Ovalles, C.; Garcia, J. J.; Espidel, Y.; Reversible Adsorption of Carbon Dioxide on Amine Surface-Bonded Silica

(56) References Cited

PUBLICATIONS

Gel; Inorganica Chim. Acta 1995, vol. 240 (1-2), pp. 183-189; https://doi.org/10.1016/0020-1693(95)04534-1.

Lee, J. J.; Chen, C. H.; Shimon, D.; Hayes, S. E.; Sievers, C.; Jones, C. W.; Effect of Humidity on the CO2 Adsorption of Tertiary Amine Grafted SBA-15; J. Phys. Chem. C 2017, vol. 121 (42), pp. 23480-23487; https://doi.org/10.1021/acs.pcc.7b07930.

Lee, J. J.; Yoo, C. J.; Chen, C. H.; Hayes, S. E.; Sievers, C.; Jones, C. W.; Silica-Supported Sterically Hindered Amines for CO2 Capture; Langmuir 2018, vol. 34 (41), 34 pp; https://doi.org/10.1021/acs.langmuir.8b02472.

Li, F. S.; Labreche, Y.; Lively, R. P.; Lee, J. S.; Jones, C. W.; Koros, W. J.; Poly(Ethyleneimine) Infused and Functionalized Torlon®—Silica Hollow Fiber Sorbents for Post-Combustion CO2 Capture; Polymer 2014, vol. 55 (6), pp. 1341-1346; https://doi.org/10.1016/j.polymer.2013.11.040.

Liu, J.; Feng, X.; Fryxell, G. E.; Wang, L.-Q.; Kim, A. Y.; Gong, M.; Hybrid Mesoporous Materials with Functionalized Monolayers; Adv. Mater. 1998, vol. 10, pp. 161-165.

Loganathan, S.; Ghoshal, A. K.; Amine Tethered Pore-Expanded MCM-41: A Promising Adsorbent for CO2 capture; Chem. Eng. J. 2017, vol. 308, pp. 827-839; https://doi.org/10.1016/j.cej.2016.09.103.

Ma, X.; Wang, X.; Song, C.; "Molecular Basket" Sorbents for Separation of CO2 and H2S from Various Gas Streams; J. Am. Chem. Soc. 2009, vol. 131 (16), pp. 5777-5783; https://doi.org/10.1021/ja8074105.

Mittal, N.; Samanta, A.; Sarkar, P.; Gupta, R.; Postcombustion CO2 Capture Using N-(3-Trimethoxysilylpropyl) Diethylenetriamine-Grafted Solid Adsorbent; Energy Sci. Eng. 2015, vol. 3 (3), pp. 207-220; https://doi.org/10.1002/ese3.64.

Moschetta, E. G.; Sakwa-Novak, M. A.; Greenfield, J. L.; Jones, C. W.; Post-Grafting Amination of Alkyl Halide-Functionalized Silica for Applications in Catalysis, Adsorption, and 15N NMR Spectroscopy; Langmuir 2015, vol. 31 (7), pp. 2218-2227; https://doi.org/10.1021/la5046817.

N.N. Linneen, R. Pfeffer, Y.S. Lin; CO2 adsorption performance for amine grafted particulate silica aerogels; Chemical Engineering Journal (2014), 38 pp; doi: http://dx.doi.org/10.1016/j.cej.2014.05.087.

Ndaba, B.; Chiyanzu, I.; Marx, S.; N-Butanol Derived from Biochemical and Chemical Routes: A Review; Biotechnol. Reports 2015, vol. 8, pp. 1-9; https://doi.org/10.1016/j.btre.2015.08.001.

Odlyha, M.; Scott, R. P. W.; Simpson, C. F.; The Hydroxyl Content of Silica Gel; J. Therm. Anal. 1993, vol. 40 (3), pp. 1197-1212; https://doi.org/10.1007/BF02546883.

Okonkwo, C. N.; Fang, H.; Sholl, D. S.; Leisen, J. E.; Jones, C. W.; Effect of Humidity on the Sorption of H2S from Multicomponent Acid Gas Streams on Silica-Supported Sterically Hindered and Unhindered Amines; ACS Sustain. Chem. Eng. 2020, vol. 8 (27), 13 pp; https://doi.org/10.1021/acssuschemeng.0c02012.

Pang, S. H.; Lee, L. C.; Sakwa-Novak, M. A.; Lively, R. P.; Jones, C W.; Design of Aminopolymer Structure to Enhance Performance and Stability of CO2 Sorbents: Poly(Propylenimine) vs Poly(Ethylenimine); J. Am. Chem. Soc. 2017, vol. 139 (10), pp. 3627-3630. https://doi.org/10.1021/jacs.7b00235.

Pang, S. H.; Lively, R. P.; Jones, C. W.; Oxidatively-Stable Linear Poly(Propylenimine)-Containing Adsorbents for CO2 Capture from Ultradilute Streams; ChemSusChem 2018, vol. 11 (15), pp. 2628-2637; https://doi.org/10.1002/cssc.201800438.

Park, J. et al.; How Well Do Approximate Models of Adsorption-Based CO2 Capture Processes Predict Results of Detailed Process Models?; Ind. Eng. Chem. Res. 2020, vol. 59 (15), pp. 7097-7108. https://doi.org/10.1021/acs.iecr.9b05363.

Santiago, R. G.; Siqueira, R. M.; Alves, C. A.; Vilarrasa-Garcia, E.; Maia, D. A. S.; Bastos-Neto, M.; de Azevedo, D. C. S.; Evaluation of the Thermal Regeneration of an Amine-Grafted Mesoporous Silica Used for CO2/N2 Separation; Adsorption 2020, vol. 26 (2), pp. 203-215; https://doi.org/10.1007/s10450-019-00112-7.

Sanz-Pérez, E. S.; Murdock, C. R.; Didas, S. A.; Jones, C. W.; Direct Capture of CO2 from Ambient Air; Chem. Rev. 2016, vol. 116 (19), pp. 11840-11876; https://doi.org/10.1021/acs.chemrev.6b00173.

Sayari, A.; Belmabkhout, Y.; Stabilization of Amine-Containing CO2 Adsorbents: Dramatic Effect of Water Vapor; J. Am. Chem. Soc. 2010, vol. 132 (18), pp. 6312-6314; https://doi.org/10.1021/ja1013773.

Schumacher, K.; Ravikovitch, P. I.; Du Chesne, A.; Neimark, A. V.; Unger, K. K.; Characterization of MCM-48 Materials; Langmuir 2000, vol. 16 (10), pp. 4648-4654; https://doi.org/10.1021/la991595i.

Serna-Guerrero, R.; Da'na, E.; Sayari, A.; New Insights into the Interactions of CO2 with Amine Functionalized Silica; Ind. Eng. Chem. Res. 2008, vol. 47 (23), pp. 9406-9412; https://doi.org/10.1021/ie801186g.

Sing, K.; Everett, D.; Moscou, L.; Pierotti, R.; Rouquerol, J.; Siemieniewska, T.; Reporting Physisorption Data For Gas/Solid Systems with Special Reference to the Determination of Surface Area and Porosity; Pure Appl Chem 1985, vol. 57, 603-619.

Songolzadeh, M.; Soleimani, M.; Takht Ravanchi, M.; Songolzadeh, R.; Carbon Dioxide Separation from Flue Gases: A Technological Review Emphasizing Reduction in Greenhouse Gas Emissions; Sci. World J. 2014, vol. 2014; 34 pp; https://doi.org/10.1155/2014/828131.

Stuckert, N. R.; Yang, R. T.; CO2 Capture from the Atmosphere and Simultaneous Concentration Using Zeolites and Amine-Grafted SBA-15; Environ. Sci. Technol. 2011, vol. 45 (23), pp. 10257-10264; https://doi.org/10.1021/es202647a.

Sujan, A. R.; Pang, S. H.; Zhu, G.; Jones, C. W.; Lively, R. P.; Direct CO2 Capture from Air Using Poly(Ethylenimine)-Loaded Polymer/Silica Fiber Sorbents; ACS Sustain. Chem. Eng. 2019, vol. 7 (5), pp. 5264-5273; https://doi.org/10.1021/acssuschemeng.8b06203.

Sánchez-Zambrano K.S. et al.; CO2 Capture with Mesoporous Silicas Modified with Amines by Double Functionalization: Assessment of Adsorption/Desorption Cycles; Materials (Basel). 2018, vol. 11 (6); 19 pp; https://doi.org/10.3390/ma11060887.

Sanchez-Zambrano, K. S.; Vilarrasa-Garcia, E.; Maia, D. A. S.; Bastos-Neto, M.; Rodriguez-Castellon, E.; Azevedo, D. C. S.; Adsorption Microcalorimetry as a Tool in the Characterization of Amine-Grafted Mesoporous Silicas for CO2 Capture; Adsorption 2020, vol. 26 (2), pp. 165-175; https://doi.org/10.1007/s10450-019-00064-y.

Tumuluri, U.; Isenberg, M.; Tan, C. S.; Chuang, S. S. C.; In Situ Infrared Study of the Effect of Amine Density on the Nature of Adsorbed CO2 on Amine-Functionalized Solid Sorbents; Langmuir 2014, vol. 30 (25), pp. 7405-7413; https:// doi.org/10.1021/la501284y.

Vilarrasa-Garcia, E. et al.; CO2 Adsorption on APTES Functionalized Mesocellular Foams Obtained from Mesoporous Silicas; Microporous Mesoporous Mater. 2014, vol. 187, pp. 125-134; https://doi.org/10.1016/j.micromeso.2013.12.023.

Vilarrasa-Garcia, E.; Cecilia, J. A.; Bastos-Neto, M.; Cavalcante, C. L.; Azevedo, D. C. S.; Rodriguez-Castellón, E.; CO2/CH4 Adsorption Separation Process Using Pore Expanded Mesoporous Silicas Functionalizated by APTES Grafting; Adsorption 2015, vol. 21 (8), pp. 565-575; https://doi.org/10.1007/s10450-015-9700-x.

Vitillo, J. G.; Smit, B.; Gagliardi, L.; Introduction: Carbon Capture and Separation; Chem. Rev. 2017, vol. 117, pp. 9521-9523; https://doi.org/10.1021/acs.chemrev.7b00403.

Wang, L.; Yang, R. T.; Increasing Selective CO2 Adsorption on Amine-Grafted SBA-15 by Increasing Silanol Density; J. Phys. Chem. C 2011, vol. 115 (43), 21264-21272; https://doi.org/10.1021/jp206976d.

Wang, L.; Yin, C.; Yang, R. T.; Selective Catalytic Reduction of Nitric Oxide with Hydrogen on Supported Pd: Enhancement by Hydrogen Spillover; Appl. Catal. A Gen. 2016, vol. 514, pp. 35-42; https://doi.org/10.1016/j.apcata.2016.01.013.

Wang, X.; Ma, X.; Xu, X.; Sun, L.; Song, C.; Mesoporous-Molecular-Sieve-Supported Polymer Sorbents for Removing H2S from Hydrogen Gas Streams; Top. Catal. 2008, vol. 49 (1-2), pp. 108-117; https://doi.org/10.1007/s11244-008-9072-5.

Wang, Y.; Yang, R. T.; Chemical Liquid Deposition Modified 4A Zeolite as a Size-Selective Adsorbent for Methane Upgrading, CO

(56) References Cited

PUBLICATIONS

2 Capture and Air Separation; ACS Sustain. Chem. Eng. 2019, vol. 7 (3), pp. 3301-3308; https://doi. org/10.1021/acssuschemeng. 8b05339.

Wang, Y.; Yang, R. T.; Template Removal from SBA-15 by Ionic Liquid for Amine Grafting: Applications to CO2 Capture and Natural Gas Desulfurization; ACS Sustain. Chem. Eng. 2020, vol. 8 (22), pp. 8295-8304; https://doi. brg/10.1021/acssuschemeng. 0c01941.

Wilson, S. M. W.; Gabriel, V. A.; Tezel, F. H.; Adsorption of Components from Air on Silica Aerogels; Microporous and Mesoporous Mater. 2020, vol. 305; 11 pp; https://doi.org/10.1016/j.micromeso. 2020.110297.

Ku, X.; Song, C.; Andresen, J. M.; Miller, B. G.; Scaroni, A. W.; Preparation and Characterization of Novel CO2 "Molecular Basket" Adsorbents Based on Polymer-Modified Mesoporous Molecular Sieve MCM-41; Microporous Mesoporous Mater. 2003, vol. 62 (1-2), pp. 29-45; https://doi.org/10.1016/S1387 1811(03)00388-3.

Yang, R. T.; Adsorbents: Fundamentals and Applications; John Wiley & Sons, Inc., 2003; 418 p; https://doi.org/10.1002/047144409X.

Yoo, C. J.; Park, S. J.; Jones, C. W.; CO2 Adsorption and Oxidative Degradation of Silica-Supported Branched and Linear Aminosilanes; Ind. Eng. Chem. Res. 2020, vol. 59 (15), pp. 7061-7071. https://doi.org/10.1021/acs.iecr.9b04205.

Yu, J.; Chuang, S. S. C.; The Role of Water in CO2 Capture by Amine; Ind. Eng. Chem. Res. 2017, vol. 56 (21), pp. 6337-6347; https://doi.org/10.1021/acs.iecr.7b00715.

Yu, J.; Chuang, S. S. C.; The Structure of Adsorbed Species on Immobilized Amines in CO2 Capture: An in Situ IR Study; Energy Fuels 2016, vol. 30 (9), 7579-7587; https://doi.org/10.1021/acs. energyfuels.6b01423.

Yuan, M. H.; Wang, L.; Yang, R. T.; Glow Discharge Plasma-Assisted Template Removal of SBA-15 at Ambient Temperature for High Surface Area, High Silanol Density, and Enhanced CO2 Adsorption Capacity; Langmuir 2014, vol. 30 (27), pp. 8124-8130. https://doi.org/10.1021/la501794z.

Yue, M. B.; Sun, L. B.; Cao, Y.; Wang, Y.; Wang, Z. J.; Zhu, J. H.; Efficient CO2 Capturer Derived from As-Synthesized MCM-41 Modified with Amine; Chem. Eur. J. 2008, vol. 14 (11), pp. 3442-3451; https://doi.org/10.1002/chem.200701467.

Zhai, Y.; Jin, H.; Chuang, S. S. C.; Silica-Supported Immobilized Amine for CO2 Capture Processes: Molecular Insight by In Situ Infrared Spectroscopy; Chemistry of Silica and Zeolite-Based Materials; 2019; pp. 121-142; https://doi.org/10.1016/b978-0-12-817813-3.00007-9.

Zhang, H.; Goeppert, A.; Prakash, G. K. S.; Olah, G.; Applicability of Linear Polyethylenimine Supported on Nano-Silica for the Adsorption of CO2 from Various Sources Including Dry Air; RSC Adv. 2015, vol. 5 (65), pp. 52550-52562; https://doi.org/10.1039/c5ra05428a.

Zhao, D.; Huo, Q.; Feng, J.; Chmelka, B. F.; Stucky, G. D.; Nonionic Triblock and Star Diblock Copolymer and Oligomeric Surfactant Syntheses of Highly Ordered, Hydrothermally Stable, Mesoporous Silica Structures; J. Am. Chem. Soc. 1998, vol. 120, pp. 6024-6036.

Zheng, F.; Tran, D. N.; Busche, B. J.; Fryxell, G. E.; Addleman, R. S.; Zemanian, T. S.; Aardahl, C. L.; Ethylenediamine-Modified SBA-15 as Regenerable CO2 Sorbent; Ind. Eng. Chem. Res. 2005, vol. 44 (9), pp. 3099-3105; https://doi.org/10.1021/ie049488t.

* cited by examiner

200

(a)                                          (b)

(c)

AMINE GRAFTED SILICA GELS

CROSS REFERENCE TO RELATED APPLICATIONS

This application claims the benefit of U.S. provisional application entitled "Amine Grafted Silica Gels," filed Jan. 15, 2020, and assigned Ser. No. 62/961,450, the entire disclosure of which is hereby expressly incorporated by reference.

GRANTS

This invention was made with government support under Contract No. CBET-1826621 awarded by the National Science Foundation. The government has certain rights in the invention.

BACKGROUND OF THE DISCLOSURE

Field of the Disclosure

The disclosure relates generally to the preparation of amine-grafted silica gels.

Brief Description of Related Technology

Carbon dioxide ($CO_2$) is a major greenhouse gas that poses a significant threat to the environment. $CO_2$ concentration in the atmosphere has been increasing at an unprecedented rate and efforts are being made to develop carbon capture and sequestration technologies. These technologies may help slow or reverse the rise of global $CO_2$ emissions.

Amine functionalized siliceous (e.g., silica-including) adsorbents are used to capture $CO_2$. Amines are functionalized on the siliceous material through amine grafting using aminosilanes or wet impregnation techniques using amine polymers. $CO_2$ reacts with the amine groups grafted on the siliceous adsorbent, thereby removing $CO_2$ from the gas contacting the adsorbent.

SUMMARY OF THE DISCLOSURE

In accordance with one aspect of the disclosure, an adsorbent includes silicon dioxide having a plurality of pores, and silane disposed on the plurality of pores. The silane is interconnected by siloxane bridges.

In accordance with another aspect of the disclosure, a method of grafting silica supports includes adding the silica support to a solvent, resulting in a first solution, adding an amount of silane to the first solution, resulting in a second solution, filtering grafted silica support from the second solution, and drying the grafted silica support.

In accordance with yet another aspect of the disclosure, a method of carbon dioxide adsorption includes exposing an amine-grafted silica support to a carbon dioxide source. The silica support has been grafted with aminosilane in a solution with water.

In connection with any one of the aforementioned aspects, the silica gels and/or methods described herein may alternatively or additionally include or involve any combination of one or more of the following aspects or features. The silane is $N^1$-(3-Trimethoxysilylpropyl) diethylenetriamine having a chemical formula of $(CH_3O)_3Si(CH_2)_3$ $NHCH_2CH_2NHCH_2CH_2NH_2$. The silicon dioxide is a mesoporous silica support. Each pore of the plurality of pores has a diameter of greater than 6 nanometers. An average diameter of each pore of the plurality of pores is within 10-15 nanometers. The adsorbent has a surface area of less than 1800 square meters per gram of silicon dioxide. The silicon dioxide has a surface area between 290-320 square meters per gram. An amount of water is added to the first solution. The amount of silane added to the first solution is greater than the amount of water added to the first solution. The amount of silane is more than 33 times by volume greater than the amount of water. The amount of silane is more than 300 times by volume greater than the amount of water. The grafted silica support is washed with toluene. The amount of silane is added to the first solution at 20 degrees Celsius to 26 degrees Celsius. The grafted silica support is dried at between 40 degrees Celsius and 60 degrees Celsius. The carbon dioxide source is ambient air or flue gas. A humidity of the carbon dioxide source is increased, resulting in a humidified carbon dioxide source. The silica gel is exposed to the humidified carbon dioxide source. A surface of the silica support is wetted.

For a more complete understanding of the disclosure, reference should be made to the following detailed description and accompanying drawing figures, in which like reference numerals identify like elements in the figures.

Figure 1:
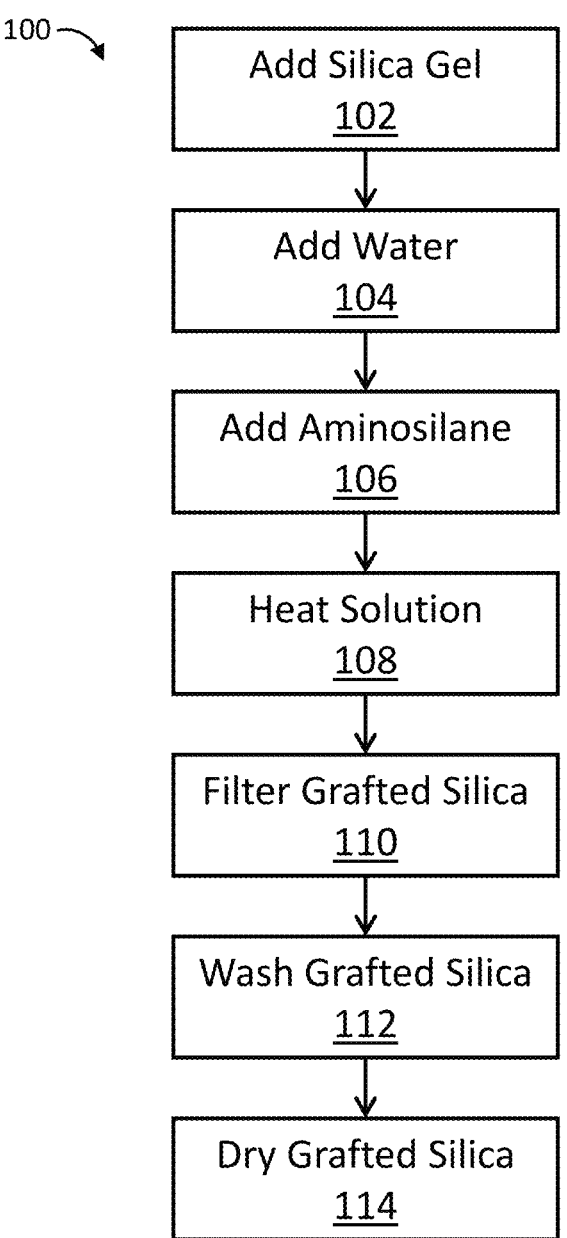
FIG. 1 is a method of grafting a silica gel in accordance with one example.

The embodiments of the disclosed silica gels, silica supports, and methods may assume various forms. Specific embodiments are illustrated in the drawings and hereafter described with the understanding that the disclosure is intended to be illustrative. The disclosure is not intended to limit the invention to the specific embodiments described and illustrated herein.

DETAILED DESCRIPTION OF THE DISCLOSURE

Silica gels grafted with amines for $CO_2$ capture are described. Methods of functionalizing amines onto the silica gels and for capturing $CO_2$ with the amine-grafted silica gels are also described. The silica gels may be grafted with an amine such as an aminosilane. The aminosilane may be $N^1$-(3-Trimethoxysilylpropyl) diethylenetriamine having a chemical formula of $(CH_3O)_3Si(CH_2)_3$ $NHCH_2CH_2NHCH_2CH_2NH_2$ (referred to as "Triamine" throughout). Additionally or alternatively, amines may be added to the silica gels with wet impregnation techniques using amine polymers.

While wet impregnated adsorbents have high $CO_2$ capture capacity and $CO_2$ uptake rates, such adsorbents experience instability over multiple cycles of $CO_2$ adsorption and desorption due to leaching and degradation of the amines. In contrast, amine-grafted adsorbents are less susceptible to leaching and degradation of the amines. Amine grafting proceeds via a reaction between the surface hydroxyl groups of an adsorbent and alkoxy groups of an aminosilane. While amine-grafting yields stable amines that are tightly bound to the adsorbent, such adsorbents may not attain the high amine concentrations exhibited by wet impregnated adsorbents. The amine capacity may be due to their low nitrogen content in comparison to wet impregnated adsorbents because amine-grafting depends on the availability of surface hydroxyl groups on the adsorbent. By adding water during the amine grafting process (known as "wet grafting" as opposed to "dry grafting" without water), the surface of the amine is hydrated, thereby increasing hydroxyl group density on the adsorbent. The addition of water during grafting may also lead to the hydrolysis of the unreacted alkoxy groups of grafted aminosilanes, which may then react with free aminosilane, and the formation of siloxane bridges of free aminosilanes to other grafted aminosilanes. In this way, the siloxane bridges interconnect the aminosilanes. Wet grafting may also be used with other silanes. For example, Benzylamino-silane, Chloropropyl-silane, Mercapto-silane, and Vinyl-silane may be used. Both of these effects increase the amount of amine that may be grafted onto the adsorbent. By using Triamine as the amine in the grafting process, a grafted adsorbent may be created that has a significantly higher nitrogen content due to a polymeric structure of the amines. The resulting Triamine-grafted adsorbents exhibit enhanced $CO_2$ capture performance.

Wet grafting using Triamine may be performed on a variety of adsorbents. For example, Triamine may be wet-grafted on MCM-41 (Mobil Composition of Matter No. 41) and the resulting adsorbent may have a $CO_2$ adsorption capacity of over 2 mmol/g. In another example, Triamine may be grafted on SBA-15 (Santa Barbara Amorphous-15)

of various pore sizes and an enhancement in $CO_2$ adsorption capacity may be realized with wet-grafting. The addition of water during grafting may increase the amount of amine that may be grafted onto the silica gel. Further, precise amounts of water added during wet grafting may precisely control the amount of amine grafted to the silica gel. Amines may be grafted on still other adsorbents, such as MCM-48 (Mobil Composition of Matter No. 48) and KIT-6 (a large mesoporous silica with cubic la3d symmetry).

Though improved $CO_2$ capture due to wet grafting of amines on ordered mesoporous silica adsorbents, such as MCM-41, SBA-15, MCM-48, and KIT-6, may be observed in the lab, it is not economically viable to produce such amine-grafted adsorbents in a commercial setting. Silica gel-based adsorbents may overcome the problems with commercial production of ordered mesoporous silica adsorbents because silica gels are already widely available, for example as desiccants. Silica gels may be available with controlled qualities (e.g. purity) and substantially lower costs. Further, the ordered mesoporous silicas may be synthesized in the form of fine powders and may need to be pelletized prior to be used for fixed-bed adsorption applications. Silica gels may be readily used for amine grafting and fixed-bed adsorption without further palletization.

Commercial production of silica gels may involve polymerizing silicic acid, Si(OH)4, via mixing a sodium silicate solution with a mineral acid (e.g., HCl or $H_2SO_4$). Silica gels with a wide range of desired pore structures and surface areas may be produced by controlling the polymerization conditions, such as silicate concentration, pH and temperature. Two types of silica gels are available commercially: regular-density gels (surface area 750-850 $m^2$/g, average pore size 2.2-2.6 mm) and low-density gels (surface area 300-350 $m^2$/g, average pore size 10-15 nm). Table 1, below, includes additional details about the surface area and pore structure of silica gels. Table 5, below, includes additional details about the surface area and pore structure of silica supports.

Carbon capture with silica gels may be performed under wet or dry conditions. Under dry conditions, carbamates may be formed when $CO_2$ reacts with the amine groups on siliceous adsorbents. When water (in the form of humidity in the $CO_2$ source, for example) is present, a larger amount of carbamate ion pairs may be formed due to the liberation of hydrogen bonded amines under wet conditions. Bicarbonate formation may also be observed under wet conditions. Overall, a greater amount of $CO_2$ may be adsorbed by the silica gels under wet conditions than dry conditions. Further method of preparing, technical properties, and uses of the silica gels are described below with respect to FIGS. 1-21.

FIG. 1 depicts a method 100 of grafting a silica gel or silica support in accordance with one example. The method 100 may include additional, fewer, or alternative acts. For example, the method 100 may or may not include one or more acts directed to adding water (act 104). In another example, the method 100 may not include heating the solution (act 108). The acts of the method 100 may be performed in other orders. For example, the method 100 may start with any of acts 102, 104, or 106. In another example, the method 100 starts with act 106, proceeds with act 102, and then onto act 104. In a further example, act 110 may proceed from act 106.

In the example of FIG. 1, the method 100 begins with an act 102 in which silica gel or silica support is combined with a solvent. The solvent may be anhydrous toluene. Solvents other than anhydrous toluene may be used. For example, ethanol, benzene, or xylene may be used. In some cases, the solvent (e.g. anhydrous toluene) is added to the silica gel or silica support. In one example, 0.5 g of silica gel or silica support and 50 mL of anhydrous toluene may be mixed together. The mixture may be stirred at room temperature (e.g. around 20-26 C) for 2 hours.

The silica gel or silica support may be identified or classified by the size of pores in the silica gel or silica support. For example, silica gel or silica supports with pore sizes or diameters of 22, 60, and 150 Å (Angstroms), corresponding to mesh sizes of 28-200, 70-230 and 200-425, respectively may be available. The 22, 60, and 150 Å silica gels or silica supports may have surface areas of 805, 338, and 309 m$^2$/g, respectively. The pore size may be nominal or may refer to an average diameter of the pores. In some cases, the silica gel or silica support may have differing pore sizes and the pore size refers to a center of the distribution of pore diameters. In one example, the silica gel or silica support may have pores with a diameter greater than 6 nm or 60 Å. In another example, the silica gel or silica support may have pores with a distribution of pore diameters centered around 15 nm or 150 Å. In a further example, the silica gel or silica support may have pores with an average diameter between 10-15 nm or 100-150 nm. Grafting amine onto the silica gel or silica support may further reduce the pore diameter. For example, amine-grafted silica gels or silica supports may have a pore diameter of less than 15 nm. In another example, the pore diameter is between 15 and 10 nm. In a further example, the pore diameter is about 12 nm.

The surface area of the underlying silica gel or silica support (e.g. of the silica gel or silica support structure that amine may be grafted to) may be measured by the Brunauer-Emmett-Teller (BET) method. In another example, the surface area of the silica gel or silica support may be measured according to the ISO 9277 standard. In some cases, the silica gel or silica support may have a surface area of about 309 m$^2$/g, less than 320 m$^2$/g, or between 290-320 m$^2$/g, for example, as shown in Table 1. In some further cases, silica gels or silica supports may have surface areas greater than 1700 m$^2$/g, for example, as shown in Table 5. Grafting amines onto the silica gel or silica support may further reduce the surface area. For example, an amine-grafted silica gel or silica support may have a surface area between 73-152 m$^2$/g.

In an act 104, water may be added. The water may be added to the mixture of act 102. Adding the water may be referred to as "wet grafting" of the silica gel or silica support. In one example, 0.15 ml of water may be added to 50 mL of anhydrous toluene and 0.5 g of silica gel or silica support. The mixture with the water may be stirred. For example, the mixture may be stirred for 2 hours. In some cases, the stirring may be done at room temperature (e.g. around 20-26 C).

In an act 106, aminosilane is added. The aminosilane may be Triamine or another aminosilane with more or fewer amine groups than Triamine. For example, monoamino silanes such as (3-Aminopropyl)triethoxysilane, (3-Amino-propyl) trimethoxysilane, 3-Aminopropyl(diethoxy)methyl-silane, 3-(Ethoxydimethylsilyl) propylamine may be used. In another example, diamino silanes such as N-[3-(Trimethoxysilyl) propyl]ethylenediamine, N-(2-Amino-ethyl)-3-aminopropyltriethoxysilane, and 3-(2-Aminoethyl-amino) propyl-dimethoxymethylsilane may be used. In a further example, triamino silanes other than Triamine, such as 3-(2-Aminoethylamino) propyl-dimethoxymethylsilane, may be used. The aminosilane may be added to the solution of silica gel or silica support and solvent (e.g. anhydrous toluene). In one example, 5 mL of aminosilane may be added to a solution of silica gel or silica support in solvent. In some cases, the amount of aminosilane may be greater than the amount of water added.

In some cases, the water of the act 104, and the aminosilane of the act 106 may be added in proportion to one another. For example, an amount (e.g. a volume) of aminosilane added may be around 300 times greater than the amount of water, around 333 times greater than the amount of water, or between 300 and 350 times greater than the amount of water. In another example, the amount of aminosilane added may be more than 33 times greater than the amount of water. In other cases, the silica gel or silica support and the water of the act 104 may be added in proportion to one another. For example, around 0.3 mL of water may be added for each gram of silica gel or silica support. In still other cases, the silica gel or silica support and the solvent (e.g. anhydrous toluene) of the act 106 may be added in proportion to one another. For example, from 10-100 mL of anhydrous toluene may be added for each gram of silica gel or silica support. In still further cases, the aminosilane of the act 106 and the anhydrous toluene may be added or present in proportion to one another. For example, the amount of anhydrous toluene may be around 10 times greater than the amount of aminosilane.

In some cases, the aminosilane of the act 106 may be mixed with or added to the solvent (e.g. of the act 102) before the addition of silica gel or silica support, creating a solution of solvent and aminosilane. The silica gel or silica support may be added to the solution of solvent and aminosilane. In one example, around 5 mL of aminosilane (such as Triamine) may be mixed with 50 mL of solvent (e.g. anhydrous toluene), and then 0.5 g of silica gel or silica support may be added to the solvent and aminosilane.

In an act 108, the mixture of aminosilane, silica gel or silica support, and toluene (and, in the case of wet grafting, water) may be stirred and heated under reflux for a period of time. For example, the mixture may be refluxed at around 85 C for 12 hours. Other temperatures may be used. In another example, the mixture may be heated to between 75 C and 95 C. In some other cases, the mixture may be heated under reflux after water has been added, such as in the act 106.

Figure 22:
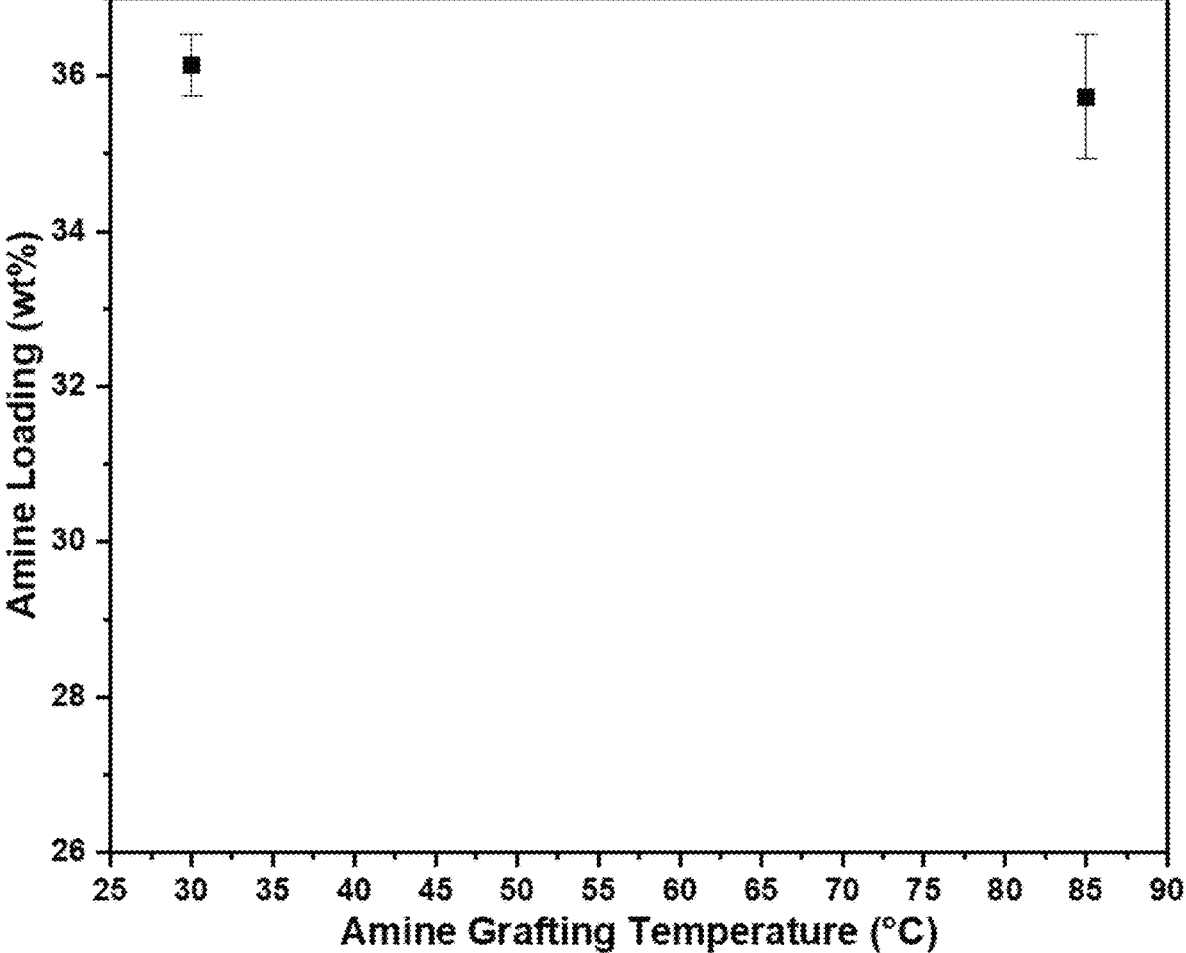
FIG. 22 is a graphical plot depicting amine loading at different amine grafting temperatures of wet grafted silica supports.

In some cases, the grafting may proceed at room temperature. For example, and as shown in FIG. 22, wet grafted SBA-15 shows similar amine loading performance for wet grafting with water at room temperature (e.g. around 20-26 C) as at higher temperatures. Grafting (e.g. wet grafting) may be conducted without raising the temperature of the solution.

In an act 110, grafted silica gel or silica support is filtered from the mixture. Through one or more of acts 102-108, the silica gel or silica support in the mixture may become grafted with aminosilane. Because the grafted silica gel or silica support may be in the solid state, the grafted silica gel or silica support may be separated from the mixture by filtering.

In an act 112, the grafted silica gel or silica support may be washed. In some cases, the grafted silica gel or silica support may be washed in toluene. Large amounts of toluene may be used to wash the grafted silica gel or silica support. For example, around 100 mL of toluene may be used. In another example, 100-400 mL of toluene may be used. In a further example, over 400 mL of toluene may be used. In some cases, more toluene may be used to wash than was used in the grafting (e.g. more toluene than used in the act 102). The silica gel or silica support may be washed until discoloration (e.g. from the grafting process) is removed.

In an act 114, the grafted silica gel or silica support is dried. The drying process may allow for the toluene (e.g. used in the act 102 or the act 112) to evaporate from the grafted silica gel or silica support. The grafted silica gel or silica support may be dried at an elevated temperature to decrease the amount of time for the grafted silica gel or silica support to dry. For example, the grafted silica gel or silica support may be dried at around 50 C. The grafted silica gel or silica support may be dried for around 8-12 hours. In some cases, the silica gel or silica support may be dried until the grafted silica gel or silica support resembles the silica gel or silica support prior to grafting. For example, the silica gel or silica support may be dried until a texture or visual appearance (e.g. color) resemble silica gel or silica supports prior to grafting. In another example, the grafted silica gel or silica support may be dried at between 40 C and 60 C. In still another example, the grafted silica gel or silica support may be dried at temperatures above 40 C.

Though the acts of FIG. 1 have been described with examples of silica gel or silica supports, the method 100 may be performed on other adsorbents. For example, the method 100 may be performed on MCM-41, SBA-15, MCM-48, KIT-6, or another adsorbent. In the case of SBA-15, the SBA-15 adsorbent may be prepared by dissolving Pluronic P123 (a symmetric triblock copolymer comprising poly (ethylene oxide) and poly(propylene oxide) in an alternating linear structure) in water and HCL. For example, around 8 g of P123 may be dissolved in around 240 mL $H_2O$ and around 40.1 mL of 37% HCl at room temperature (e.g. around 20-26 C). Once dissolved, the temperature may be increased and Tetraethyl orthosilicate (TEOS) may be added dropwise. For example, the temperature may be raised to around 35 C and around 18.2 mL of TEOS may be added. The solution may be stirred at different temperatures. For example, the mixture may be stirred at around 35 C for 24 hours, followed by another 24 hours at 100 C. After mixing, a white solid may precipitate and filtered from solution. Once filtered, the white solid may be washed with water and dried. For example, the white solid may be dried at around 50 C overnight. Once dried, the white solid may be calcined. For example, the white solid may be calcined at around 550 C for 6 hours under air flow. SBA-15 may be formed as a result of this process. Once formed, the SBA-15 may be amine grafted according to the method 100.

Figure 2:
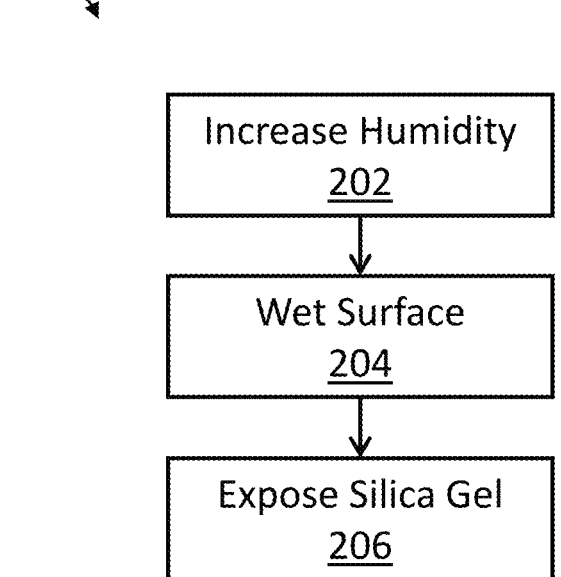
FIG. 2 is a method of carbon dioxide adsorption in accordance with one example.

FIG. 2 depicts a method 200 of carbon dioxide adsorption in accordance with one example. The method 200 may use the grafted silica gels produced via the method 100, and/or other silica gels. The method 200 may use the wet-grafted silica gel produced vis the method 100, for example.

The method 200 may include additional, fewer, or alternative acts. For example, the method 200 may or may not include one or more acts directed to adding water (act 204) or increasing humidity of the $CO_2$ source (act 202). The acts of the method 200 may be performed in other orders. For instance, the method 200 may start with any of acts 202, 204, or 206. In one example, the method 200 starts with act 204, proceeds with act 202, and then onto act 206.

In an act 202, the humidity of a $CO_2$ source may be increased. The humidity of the $CO_2$ source may refer to the humidity of a point or broad source of the $CO_2$ or of the humidity of the stream of gaseous $CO_2$ contacting the silica gel. The humidity of the $CO_2$ source may be increased before or during contact with the silica gel (e.g. in the act 206). While silica gel may adsorb $CO_2$ from a dry source or from $CO_2$ with little humidity, increasing the humidity may increase the adsorption of $CO_2$ by the silica gel. For example, the $CO_2$ source may have a 0% relative humidity.

In another example, the $CO_2$ source may have a relative humidity of 20% or less. In one example, the $CO_2$ source may have a relative humidity of around 60%. In another example, the $CO_2$ source may have a humidity of 40%-60%. In a further example, the $CO_2$ source may have a relative humidity of greater than 50%. Once humidified, or if the $CO_2$ source has greater than 0% relative humidity, the $CO_2$ source or the $CO_2$ gas may be referred to as a humidified $CO_2$ source or gas. Humidity in the $CO_2$ source may increase breakthrough capacity in the adsorbent, as described below with respect to FIG. 12. Adsorption under wet conditions (e.g. in the presence of humidity or a humid $CO_2$ source) may result in more carbamate ion pairs being formed (e.g. due to the liberation of hydrogen bonded amines) than under dry conditions In one example, the humidity of the $CO_2$ may be increased by passing the gas stream through a bubbler. The bubbler may include a salt solution. For example, the salt solution may be or include a saturated KCl solution. In some cases, the bubbler, the solution, or the gas stream may reside at a predetermined temperature. For example, the bubbler, the solution, or the gas stream may have a temperature of about 25 C. Once passed through the bubbler, the $CO_2$ may be contacted with the adsorbent.

In an act 204, water may be added to a silica gel adsorbent. The act 204 may be considered a "wetting" process. The silica gel may be grafted with an amine. In some cases, the amine may be an aminosilane, such as Triamine. The silica gel may be prepared by wet grafting silica gel in a solution with water. Wet-grafting may increase the ability of the silica gel to adsorb $CO_2$ from the source. In some cases, the water may be introduced to the surface of the silica gel, or to one or more layers (such as amine layers) grafted on to the silica gel. Wetting the adsorbent may increase breakthrough capacity and breakthrough time, as described below with respect to FIG. 12. Wetting the surface of the adsorbent may result in carbamate formation due to the liberation of hydrogen bonded amines under wet conditions, while bicarbonate formation may be observed as well. The formation of these additional compounds from the $CO_2$ source may increase the adsorption of $CO_2$ by the adsorbent. Further, wetting the silica gel may inhibit the formation of urea groups that deactivate amines grafted on the adsorbent.

In an act 206, silica gel is exposed to $CO_2$. The $CO_2$ may be a gas introduced from the $CO_2$ source. In some cases, the source of the $CO_2$ may be an enriched $CO_2$ source. For example, the silica gel may adsorb $CO_2$ from a flue gas source. In some other cases, the source of the $CO_2$ may be a non-enriched source. For example, the non-enriched source of $CO_2$ may be ambient air. The $CO_2$ source may have a concentration of $CO_2$ in the parts-per-million (ppm) range. For example, the $CO_2$ source may have a concentration of $CO_2$ that is about 415 ppm. The amine-grafted silica gel may adsorb $CO_2$ from a variety of sources having a range of $CO_2$ concentrations. In some cases, the $CO_2$ source may be humidified, e.g. according to the act 202. The silica gel may be packaged together to adsorb the $CO_2$. For example, the silica gel may be packed into a fixed bed inside a housing. The $CO_2$ may be passed through the housing containing the silica gel and be adsorbed by the silica gel. Other packaging of the silica gel for adsorption may be used.

In some cases, the $CO_2$ may need to desorbed from the adsorbents in a process known as regeneration. The adsorbents may be regenerated using various techniques. For example, Temperature Swing Adsorption (TSA), Pressure Swing Adsorption (PSA) and Vacuum Swing Adsorption processes may be used to regenerate the adsorbent. With the TSA process, the adsorbent is regenerated by raising the temperature of the adsorbent. For example, the temperature may be raised using preheated gas, waste heat, or steam. With the PSA and VSA processes, the adsorbent is regenerated by reducing the pressure around the adsorbent. For example, the pressure in the fixed bed containing the adsorbent may be reduced.

Though the acts of FIG. 2 have been described with examples of adsorbing carbon dioxide, the method 200 may be performed to adsorb Hydrogen Sulfide ($H_2S$), Sulfur Oxides ($SO_x$), and Nitrogen Oxides ($NO_x$).

Figure 3:
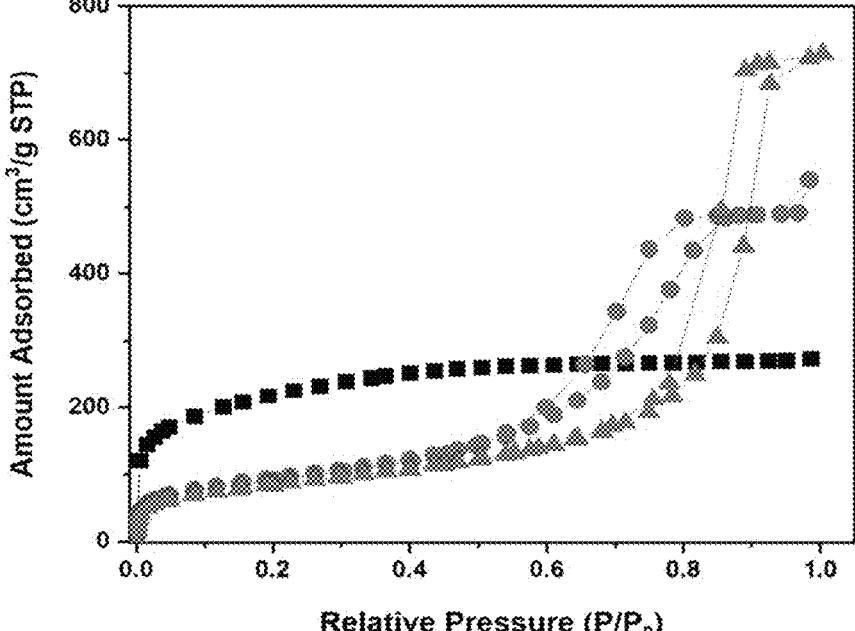
FIG. 3 is a graphical plot depicting nitrogen adsorption-desorption isotherms for silica gels.
Figure 4:
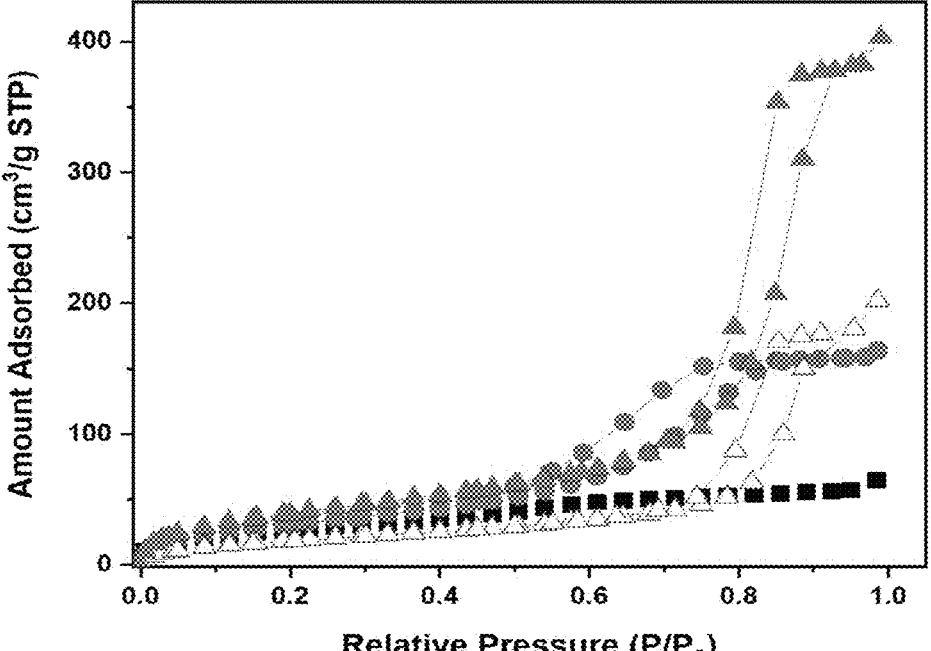
FIG. 4 is a graphical plot depicting nitrogen adsorption-desorption isotherms for amine-grafted silica gels.
Figure 5:
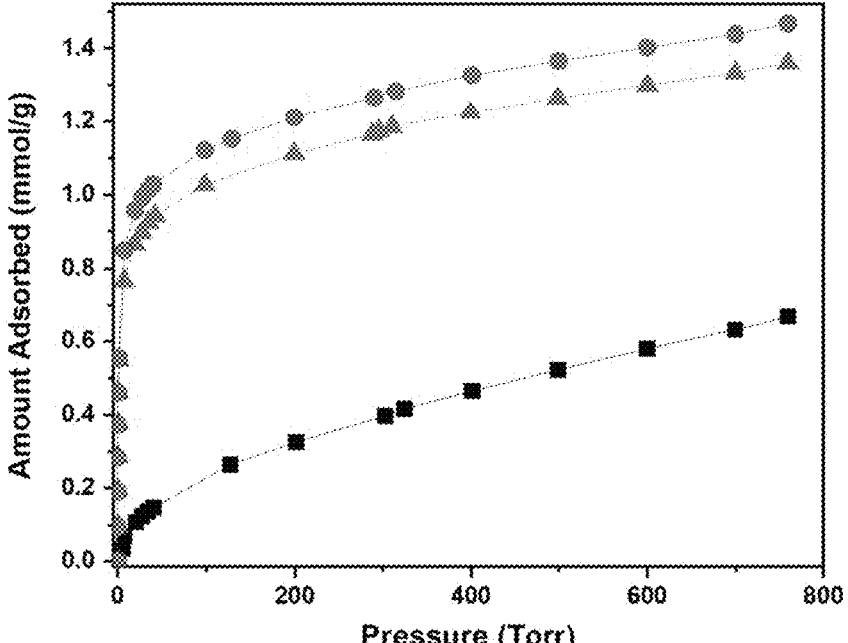
FIG. 5 is a graphical plot depicting carbon dioxide adsorption isotherms for amine-grafted silica gels.

FIGS. 3-5 show $CO_2$ and nitrogen adsorption-desorption isotherms for examples of silica gels produced via the disclosed methods. Silica gel samples with pore sizes of 22, 60, and 150 Angstroms (Å) and corresponding mesh sizes of 28-200, 70-230 and 200-425, respectively, were obtained. In one example, such silica gels may be obtained from Sigma Aldrich. The silica gel with pore sizes 22, 60, and 150 Å are referenced herein as "22A," "60A," and "150 Å," respectively. The silica gels may be grafted with amine (e.g. Triamine) and referenced herein as "AG-22A," "AG-60A," and "AG-150A," for pore sizes 22, 60, and 150, respectively. Wet amine-grafted (e.g. Triamine-grafted) silica gel with pore size 150A are referenced herein as "W-AG-150A." The W-AG-150A silica gel may be prepared, for example, according to the method 100 of FIG. 1 and/or another method. Silica gels in different sizes and prepared by different techniques may be examined to determine whether these properties affect the $CO_2$ adsorption performance. The different adsorbents and their physical properties are summarized in Table 1 below.

TABLE 1

| Surface area and pore structure parameters of silica gel samples | | | |
| --- | --- | --- | --- |
| Adsorbent | BET Surface Area [m²/g] | Pore Diameter [nm] | Total Pore Volume [cm³/g] |
| 22A | 805 | 2.5 | 0.43 |
| AG-22A | 98.1 | — | 0.10 |
| 60A | 338 | 8.15 | 0.84 |
| AG-60A | 122 | 7.03 | 0.25 |
| 150A | 309 | 14.9 | 1.12 |
| AG-150A | 152 | 12.1 | 0.62 |
| W-AG-150A | 73.1 | 12.5 | 0.31 |

The nitrogen isotherms may be measured on a Micromeritics ASAP 2020 Sorptometer using a volumetric technique. The nitrogen isotherms may be measured at −196 C and 25 C. To obtain the results of FIGS. 3-4, the silica gel samples may be degassed overnight at 105 C prior to the isotherm measurements. Amine loading analysis may be performed by pretreating the sample under a helium flow for 2 hours at 100 C, then heating to 850 C at a heating rate of 5 C/min under a helium and air flow.

FIG. 3 depicts a graphical plot depicting nitrogen adsorption-desorption isotherms for plain (e.g. ungrafted) silica gels. The square (■) data series represents a nitrogen adsorption-desorption isotherm at −196 C for 22A silica gels. The circle (●) data series represents a nitrogen adsorption-desorption isotherm at −196 C for 60A silica gels. The triangle (▲) data series represents a nitrogen adsorption-desorption isotherm at −196 C for 150A silica gels.

The 60A and 150A silica gels exhibited a type IV isotherm. The type IV isotherm is obtained when a finite amount layers of adsorbate (e.g. nitrogen or $CO_2$ in the cases of FIGS. 3-5) form on the adsorbent (e.g. the silica gel) and the amount of adsorbate captured by the adsorbent plateaus around a relative or partial pressure of 1 as the pores and capillaries in the adsorbent are filled. The type IV isotherm may indicate a standard mesoporous material (e.g. a material having pores with diameters between 2 nm (20 Å) and 50 nm (500 Å)). The presence of the Type IV isotherm confirms the pore size of the 60A and 150 A silica gels.

The 22A silica gel exhibited a type I isotherm. The type I isotherm is obtained when adsorption forms only a single layer of adsorbate on the surface of the adsorbate. The type I isotherm may indicate the presence of a microporous material (e.g. a material having pores with diameters less than 2 nm (20 Å). The Barrett, Joyner and Halenda (BJH) pore size distribution is centered around 14.97 nm for 150A, 8.15 nm for 60A, and 2.5 nm for 22A silica gels, respectively. Because the silica gels may have pores in a distribution of sizes, the BJH pore distribution centered at 2.5 nm for the 22A silica gel along with the observed type I isotherm means that there are some pores on the 22A silica gel with diameters less than 2 nm.

FIG. 4 depicts a graphical plot depicting nitrogen adsorption-desorption isotherms for dry amine-grafted silica gels. The square (■) data series represents a nitrogen adsorption-desorption isotherm at −196 C for AG-22A silica gels. The circle (●) data series represents a nitrogen adsorption-desorption isotherm at −196 C for AG-60A silica gels. The triangle (▲) data series represents a nitrogen adsorption-desorption isotherm at −196 C for AG-150A silica gels. The open triangle (△) data series represents a nitrogen adsorption-desorption isotherm at −196 C for W-AG-150A silica gels.

In order to investigate the influence of amine grafting on the physical properties of the silica gels, dry grafting using Triamine may be performed on the silica gels. After dry grafting, a decrease in surface area, pore size and pore volume compared to standard silica gels (e.g. 22A, 60A, and 150A) may be observed. The silica gel samples with larger pores such as AG-60A and AG-150A showed much lower decreases than the smaller pore silica gel (e.g. AG-22A). This decrease may be attributed to the blockage of the pores after Triamine grafting, confirming that Triamine may be successfully grafted on the silica gel samples. The decrease also shows that an increase in amine concentration correlates with a decrease in surface area, pore size and pore volume. Even after Triamine grafting, AG-150A still exhibits a type IV isotherm, a pore size of 12.11 nm, and pore volume of 0.62 cm³/g, meaning that the mesopores on the AG-150A silica gel are preserved through dry-grafting.

The nitrogen adsorption isotherm for W-AG-150A exhibited a type IV isotherm which means its mesopores were retained. Additionally, decrease in nitrogen adsorbed, surface area, pore size and pore volume after wet grafting were observed. The surface area, pore size and pore volume decreased by 76%, 16%, 72%, respectively, which are larger when compared to the dry counterpart (e.g. AG-150A). The losses in surface area, pore size and pore volume when compared to dry grafting may be attributed to a greater amount of amine grafted on 150A silica gel following wet grafting. The greater amount of amine grafted onto the silica gel with wet grafting may be shown in FIG. 6, for example.

FIG. 5 depicts a graphical plot depicting $CO_2$ adsorption isotherms for amine-grafted silica gels. The square (■) data series represents a $CO_2$ adsorption isotherm at 25 C for AG-22A silica gels. The circle (●) data series represents a $CO_2$ adsorption isotherm at 25 C for AG-60A silica gels. The triangle (▲) data series represents a $CO_2$ adsorption isotherm at 25 C for AG-150A silica gels. FIG. 5 indicates that AG-150A had a maximum $CO_2$ capacity of 1.35 mmol/g at 1 bar, which is similar to AG-60A (1.46 mmol/g). Silica gel samples with the high amine loading showed the highest $CO_2$ adsorption capacity. However, additional increases in amine loading past the optimal conditions may lead to a marked decrease in $CO_2$ adsorption capacity due to pore clogging and the potential for complete blockage of the pores, thereby preventing $CO_2$ ingress and adsorption. Silica gels with high amine loading and accessibility but without pore blockage may exhibit good $CO_2$ capture performance. The large pore silica gel sample AG-150A may meet these conditions. The adsorption performance of 150A silica gel may be further enhanced by wet grafting over dry grafting because even greater amounts of amine may be grafted onto the silica gel. The enhanced performance may be shown in FIG. 4 as explained above. $CO_2$ adsorption capacity of the silica gels are shown in Table 2 below.

TABLE 2

CO₂ adsorption capacity and amine loading of dry and wet grafted adsorbents.

| Adsorbent | $CO_2$ Adsorption Capacity [mmol/g, at 25 C. and 1 bar] | Amine Loading [mmol/g] | Amine Efficiency [mol $CO_2$/mol N, at 25 C. and 1 bar] | $CO_2/N_2$ Selectivity [at 25 C. and 1 bar] |
|---|---|---|---|---|
| AG-22A | 0.66 | 2.45 | — | — |
| AG-60A | 1.46 | 4.13 | — | — |
| AG-150A | 1.35 | 3.39 | 0.398 | 32.9 |
| W-AG-150A | 1.97 | 5.12 | 0.384 | 63.1 |

Figure 6:
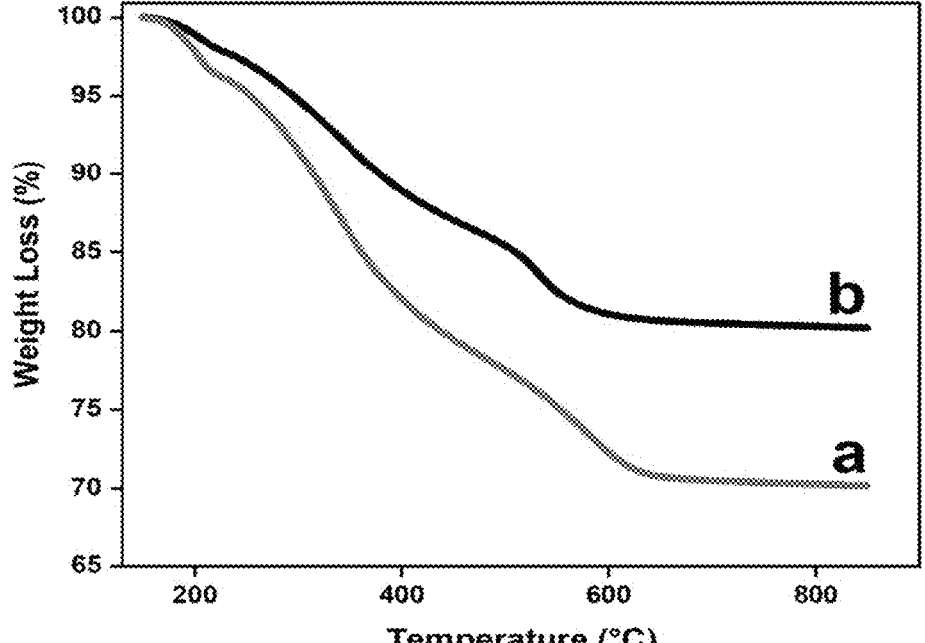
FIG. 6 is a graphical plot depicting thermograms of wet grafted and dry grafted silica gels.

FIG. 6 depicts a graphical plot depicting thermograms of wet grafted and dry grafted silica gels. The "a" data series represents a thermal gravimetric analysis (TGA) thermogram of wet-grafted W-AG-150A in air flow. The "b" data series represents a TGA thermogram of dry-drafted AG-150A in air flow. TGA may be performed using a Shimadzu TGA-50H. Because weight loss observed before 150 C may be due to the desorption of atmospheric $CO_2$ and adsorbed water, as well as the removal of methoxy ligands, data collected below 150 C may be omitted to compare only the amount of amine adsorbed by the wet grafted and dry grafted silica gels; the weight loss observed at or above 150 C may be a result of the decomposition of the grafted amine on the silica gels. The weight of the silica gels decreased more slowly around 600 C, indicating that the grafted amine on the silica gel underwent degradation and air oxidation from 150-600 C. The W-AG-150A wet-grafted silica gel exhibited a 29.9% weight loss overall, while its dry counterpart AG-150A exhibited only a 19.8% weight loss. The increased weight loss under thermal decomposition of the wet-grafted silica gel indicates that the addition of water during grafting may increase amine concentration.

Figure 7:
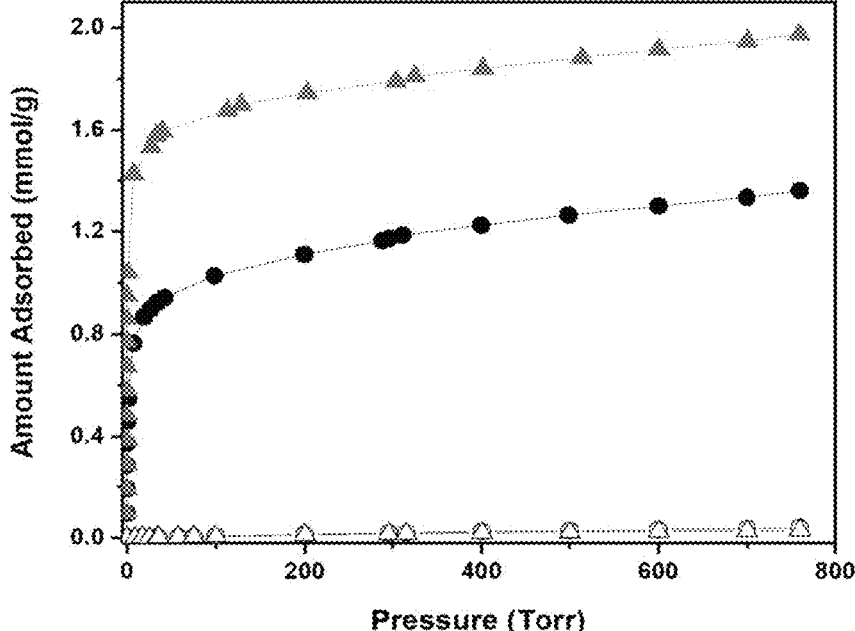
FIG. 7 is a graphical plot depicting carbon dioxide and nitrogen adsorption isotherms for wet grafted and dry grafted silica gels.

FIG. 7 depicts a graphical plot depicting $CO_2$ and nitrogen adsorption isotherms for wet grafted and dry grafted silica gels. The circle (●) data series represents a $CO_2$ adsorption isotherm at 25 C for AG-150A silica gels. The open circle (○) data series represents a nitrogen adsorption isotherm at 25 C for AG-150A silica gels. The triangle (▲) data series represents a $CO_2$ adsorption isotherm at 25 C for W-AG-150A silica gels. The open triangle (△) data series represents a nitrogen adsorption isotherm at 25 C for W-AG-150A silica gels. The $CO_2$ adsorption of silica gels may be measured to verify that an increase in amine loading (e.g. due to wet-grafting) results in enhanced $CO_2$ capture capacity. FIG. 7 shows a sharp vertical increase in adsorption in the low-pressure region between 0 and 0.2 bar, which corresponds to a strong interaction between the amine groups on the silica gels and $CO_2$ molecules. Within the low-pressure region, there is a higher increase in adsorption for W-AG-150A, when compared to AG-150A. This may be due to the wet-grafted silica gel having a greater amount of amine groups grafted than the dry-grafted silica gels, so interaction strengths between the support (e.g. the underlying silica gel) and $CO_2$ molecules are weaker. The increase in $CO_2$ adsorption at low pressures may indicate that the wet-grafted silica gels are capable of adsorbing $CO_2$ from air, without additional pressurization. Further, the increase in adsorption from 0.2 bar to 1 bar corresponds to physical adsorption (e.g. via van der Waals interactions) of $CO_2$ on the silica gel samples. The $CO_2$ adsorption capacity at 1 bar and 25 C for W-AG-150A is 1.97 mmol/g (e.g. as shown in Table 2), which is 46% higher than AG-150A.

Another factor affecting the performance of amine-grafted adsorbents is amine efficiency (e.g. measured in mol $CO_2$ adsorbed per mol N present on the adsorbent). In some cases, under dry grafting conditions, the maximum theoretical amine efficiency may be 0.5. Efficiency values above the maximum theoretical value correspond to wet grafting conditions. From Table 2, AG-150 and W-AG-150A show maximum amine efficiencies of 0.398 and 0.384, respectively. Table 2 shows that, after wet grafting, there is a negligible decrease in amine efficiency as compared to the dry-grafted silica gel. This shows that a large portion of the grafted amines on W-AG-150A may contribute to the adsorption of $CO_2$ and that the higher amine loading may not negatively impact the accessibility of the amines.

Because $CO_2$ sources may also contain other gasses, such as nitrogen, the selectivity for adsorbents for $CO_2$ over the other gasses is another factor affecting the performance of amine-grafted adsorbents. For example, flue gas may be composed of mostly nitrogen and $CO_2$, so selectivity for $CO_2$ over nitrogen is an important factor in an adsorbent used to remove $CO_2$ from the flue gas. At 25 C, AG-150A and W-AG-150A adsorbed little to no nitrogen, exhibiting high selectivity. AG-150A exhibited a $CO_2/N_2$ single-component selectivity of 119 at 0.15 bar and 32 at 1 bar. W-AG-150A exhibited a $CO_2/N_2$ selectivity of 195 at 0.15 bar and 63 at 1 bar. The $CO_2/N_2$ selectivity for wet grafted silica gel W-AG-150A is 1.6 times at 0.15 bar and 1.9 times higher at 1 bar than the dry grafted silica gel AG-150A. The increased selectivity may mean that the addition of water during the grafting process to increase amine concentration did not abate the $CO_2/N_2$ selectivity. Because nitrogen adsorption may be expected to decrease at higher temperatures, it may be expected that the $CO_2/N_2$ selectivity of wet-grafted silica gels may be higher at higher temperatures (e.g. at or above 75 C).

Figure 8:
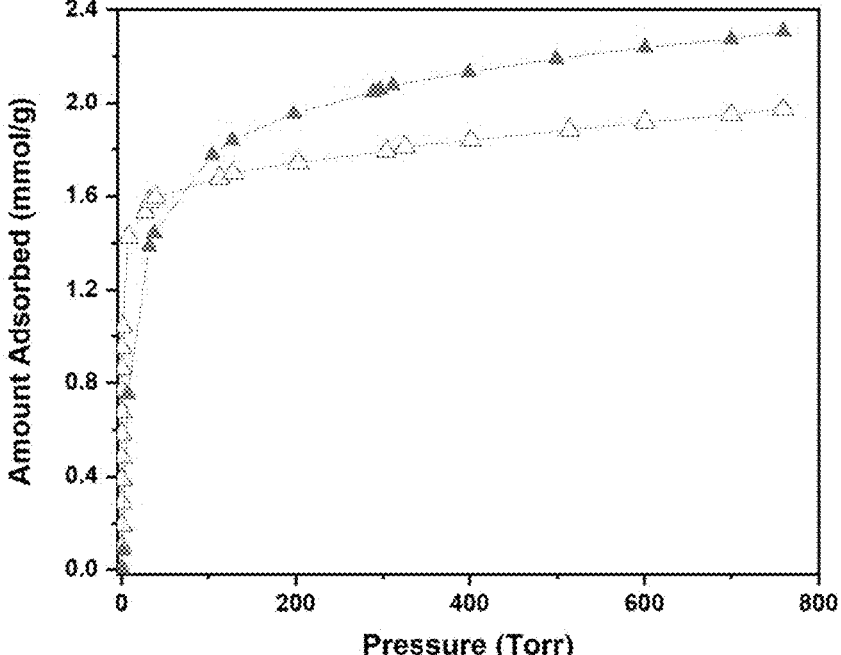
FIG. 8 is a graphical plot depicting carbon dioxide adsorption isotherms for wet grafted silica gels.

FIG. 8 depicts a graphical plot depicting $CO_2$ adsorption isotherms for wet grafted silica gels. The open triangle (△) data series represents a $CO_2$ adsorption isotherm at 25 C for W-AG-150A silica gels. The triangle (▲) data series represents a $CO_2$ adsorption isotherm at 75 C for W-AG-150A silica gels. While FIG. 5 shows adsorption at temperatures of 25 C, $CO_2$ sources may be adsorbed at different temperatures. For example, flue gas (or combustion gas) may be cooled to a temperature greater than 25 C. In some cases, the flue gas may be cooled to a temperature between 44 C and 70 C. In some other cases, the flue gas may be cooled to a temperature between 54 C and 80 C.

FIG. 8 shows an increase in $CO_2$ adsorption with increasing temperature of the $CO_2$ source. For flue gas (~0.15 bar $CO_2$), the $CO_2$ adsorption capacity of W-AG-150A increased from 1.69 mmol/g (25 C) to 1.83 mmol/g (75 C). At 1 bar, the $CO_2$ adsorption capacity increased from 1.97 mmol/g (25 C) to 2.3 mmol/g (75 C). The $CO_2$ adsorption capacity may decrease, however, at temperatures greater than 75 C, as shown in FIG. 9.

Figure 9:
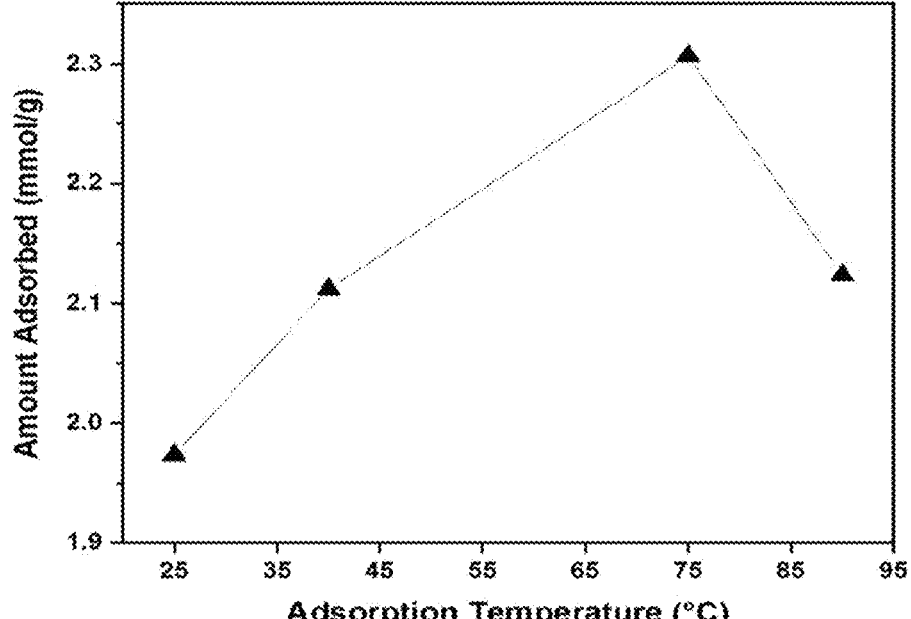
FIG. 9 is a graphical plot depicting carbon dioxide adsorption capacity of wet grafted silica gels.

FIG. 9 depicts a graphical plot depicting $CO_2$ adsorption capacity of wet grafted silica gels. The triangle (▲) data series represents a $CO_2$ adsorption isobar at 1 bar of pressure for W-AG-150A silica gels at different temperatures. FIG. 9 shows a decrease in $CO_2$ adsorption capacity beyond 75 C. The $CO_2$ adsorption capacity was 2.12 mmol/g at 1 bar and 90 C. Wet impregnated adsorbents using polyethyleneimine (PEI) and wet-grafted adsorbents (such as wet-grafted silica gels) with a high degree of aminosilane polymerization show the greatest $CO_2$ adsorption capacity around 75 C because the adsorption process faces diffusion limitations within the pores, thereby causing some of the amines to be inaccessible to the $CO_2$ without additional energy. Increasing the temperature may cause the polymer-like amines to become more mobile, thereby allowing $CO_2$ access to more amines and increasing the $CO_2$ adsorption capacity of the adsorbent. However, increasing the temperature by too much (e.g. beyond 75 C) may result in a decrease in $CO_2$ adsorption capacity. At temperatures above 75 C, the thermodynamic equilibrium shifts and the overall $CO_2$ adsorption capacity decreases.

The $CO_2$ adsorption capacity of various adsorbents, including W-AG-150A silica gels, is shown in Table 3 below.

TABLE 3

Summary of reported and literature wet grafted silica adsorbents and their $CO_2$ capture capacities.

| Adsorbent | Amine Used | CO₂ Partial Pressure [bar] | Temperature [C.] | Capacity [mmol/g, dry] |
|---|---|---|---|---|
| | | $CO_2$ Adsorption Capacity | | |
| MCM-41 | Triamine | 0.2 | 75 | 2.1 |
| KIT-6 | APTES | 1 | 25 | 1.56 |
| SBA-15 | Diamine | 0.15 | 60 | 1.36 |
| SBA-15 | Triamine | 0.15 | 60 | 1.58 |
| SBA-15 | Triamine | 0.05 | 25 | 1.88 |
| SBA-15 | Triamine | 0.89 | 75 | 2.3 |
| W-AG-150A | Triamine | 1 | 25 | 1.97 |
| W-AG-150A | Triamine | 1 | 75 | 2.3 |

Figure 10:
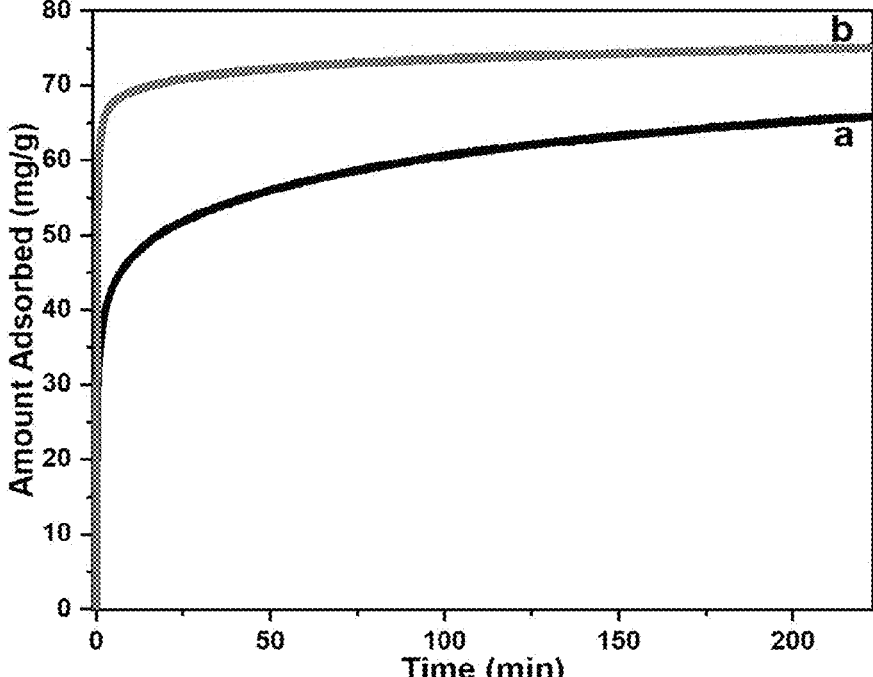
FIG. 10 is a graphical plot depicting carbon dioxide uptake rates for wet grafted silica gels.

FIG. 10 depicts a graphical plot depicting $CO_2$ uptake rates for wet grafted silica gels. The "a" data series represents the $CO_2$ uptake rate of wet-grafted W-AG-150A at 25 C under a 70% $CO_2$ (in He) flow. The "b" data series represents the $CO_2$ uptake rate of wet-grafted W-AG-150A at 75 C under a 70% $CO_2$ (in He) flow. The uptake, or adsorption rates, may be measured using a Thermogravimetric Analyzer (TGA). For example, the silica gel sample may be loaded into the TGA, the temperature may be set (e.g. to 25 or 75 C), and then $CO_2$ may be fed into the TGA. The weight increase and time are recorded by the TGA. The $CO_2$ uptake rates for wet amine-grafted silica gel have not previously been measured. The measurements of FIG. 10 may be obtained by introducing W-AG-150A to a 70% $CO_2$/He feed gas mixture at time=0 (starting from an initially all helium flow), at the desired temperature (e.g. at 25

C or 75 C). FIG. 10 shows that the $CO_2$ adsorption capacity after 200 minutes is 65.9 mg/g at 25 C and 75.2 mg/g at 75 C. The increased adsorption capacity at 75 C over 25 C may be due to the enhanced accessibility of the amines by $CO_2$.

The $CO_2$ uptake rates may be expressed as a diffusion time constant ($D/R^2$, where D is pore diffusivity and R is the radius of the particle (e.g. $CO_2$)). Data obtained from the TGA may be used to determine the uptake rate. The diffusion time constant may be calculated from the TGA data presented in FIG. 10. At 25 C, W-AG-150A showed a diffusion time constant of $2.767 \times 10^{-3}$ $s^{-1}$ and at 75 C, W-AG-150A showed a diffusion time constant of $5.242 \times 10^{-3}$ $s^{-1}$. The higher diffusion time constant indicates a higher uptake rate. The uptake rates at 75 C are 52% higher than the uptake rates at 25 C. The increased rate of adsorption at 75 C may be due to the increased kinetic energy of the $CO_2$ molecules as temperature increases, leading to faster diffusion of the $CO_2$ molecules in the pores.

Figure 11:
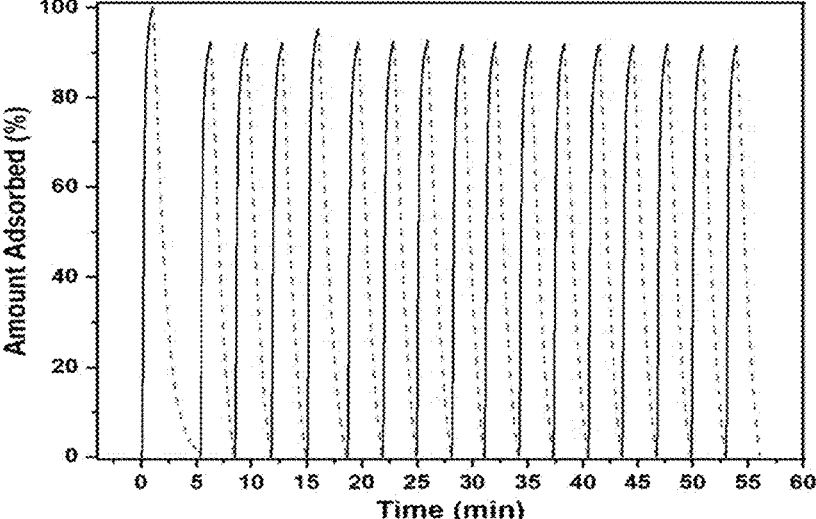
FIG. 11 is a graphical plot depicting carbon dioxide adsorption-desorption cycles for wet grafted silica gels.

FIG. 11 depicts a graphical plot depicting $CO_2$ adsorption-desorption cycles for wet grafted silica gels. The solid lines represent successive adsorption curves of wet-grafted W-AG-150A at 75 C and 1 bar in the presence of 70% $CO_2$ in He flow. The dashed lines represent successive desorption (e.g. regeneration) curves of wet-grafted W-AG-150A at 90 C and 1 bar in the presence of He flow. Each desorption process occurred over around 3 minutes, after which the W-AG-150A may be nearly fully regenerated. Because adsorbents may lose adsorption capacity after multiple adsorption-desorption cycles, adsorbents with stable adsorption capacity over adsorption-desorption cycles may be desirable. Over 17 adsorption-desorption cycles, W-AG-150A showed no significant loss in $CO_2$ adsorption capacity at 75 C. Some loss in adsorption capacity may be attributed to the formation of urea groups after repeated adsorption-desorption cycles at high temperatures, as well as possible carbamate decomposition. However, the formation of the urea groups, which serve to deactivate grafted amines, may be inhibited by performing $CO_2$ adsorption in wet conditions.

Figure 12:
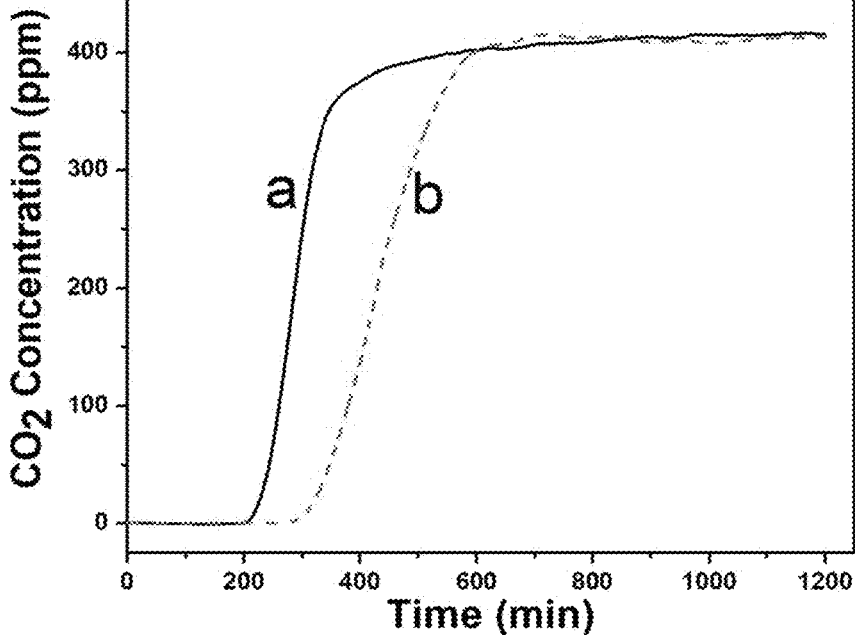
FIG. 12 is a graphical plot depicting carbon dioxide breakthrough curves for wet grafted silica gels.

FIG. 12 depicts a graphical plot depicting $CO_2$ breakthrough curves for wet grafted silica gels. The $CO_2$ breakthrough adsorption measurement may be performed using a vertical, fixed-bed with ambient air feed in a down-flow manner. The $CO_2$ concentration of the effluent gas may be continuously monitored with a Vaisala GMP343 $CO_2$ probe. The Vaisala GMP343 incorporates a silicon-based non-dispersive infrared sensor with a measurement range of 0-1000 ppm of $CO_2$. Unlike SBA-15 and other mesoporous silicas, which come in the form of fine powders, the amine-grafted silica gel is in the form of granular particles with the size range of 28-425 mesh and may be used directly in fixed-bed breakthrough measurements. In one example, the fixed-bed column may be 2 cm in height and 0.35 cm in diameter. An indent and a small piece of quartz wool may be used to contain the fixed-bed. Before the adsorption process, the fixed-bed column may be, for example, degassed at 105 C for 3 hours under nitrogen flow prior to adsorption measurements. The temperature may be then reduced to 25 C and the feed gas (ambient air) introduced at a gas-hourly space velocity (GHSV) of 6500 h-1. For the adsorption measurement involving moisture or humidity, the feed stream may be passed through a bubbler containing a saturated KCl solution at 25 C before being introduced to the fixed-bed.

The "a" data series represents the $CO_2$ breakthrough curve of wet-grafted W-AG-150A at 25 C, 0.96 Bar, and 0.0% relative humidity. The "b" data series represents the $CO_2$ breakthrough curve of wet-grafted W-AG-150A at 25 C, 0.96 Bar, and 60% relative humidity. The breakthrough curves were obtained using an ambient air $CO_2$ source with 415 ppm of $CO_2$ at a gas hourly space velocity of 6,500 hr$^{-1}$. The ambient air used in obtaining the "a" data series may be dried using 3A zeolite prior to being introduced to the silica gel adsorbent. The steep slope on the breakthrough curves indicates the lack of significant limitations on mass transfer or diffusion of $CO_2$ into pores of the adsorbent. Significant limitations on mass transfer (e.g. due to clogging or block-age of the pores in the adsorbent) reduce the slope of the breakthrough curve because the $CO_2$ would take longer to adsorb. The increased breakthrough capacity and longer breakthrough time occur under wet adsorption conditions because more carbamate ion pairs are formed (e.g. due to the liberation of hydrogen bonded amines) under wet conditions than under dry conditions. The formation of bicarbonates may also be observed under wet adsorption conditions. The increased $CO_2$ adsorption under wet conditions indicate that wet-grafted W-AG-150A adsorbent may be well-suited for capturing $CO_2$ directly from ambient air.

The $CO_2$ adsorption capacities under dry and wet condi-tions are 0.773 and 1.098 mmol/g, respectively. Previous research has observed the $CO_2$ capacity of zeolites (such as Li-LSX, K-LSX, and NaX). Under dry conditions, the breakthrough capacity of W-AG-150A (0.773 mmol/g) may be similar to Li-LSX (0.82 mmol/g), the best performing zeolite, and significantly higher than K-LSX (0.25 mmol/g), NaX (0.32 mmol/g) and amine-grafted SBA-15 (0.09 mmol/ g). Under wet conditions, the $CO_2$ adsorption capacity of W-AG-150A and amine-grafted SBA-15 increased by 42% (1.098 mmol/g) and 44% (0.13 mmol/g), respectively. Con-versely, the zeolites experienced almost a total loss of all $CO_2$ adsorption capacity under wet adsorption conditions, as has been observed for other zeolites under wet conditions. The $CO_2$ adsorption capacity of 1.098 mmol/g for wet grafted W-AG-150A at 25 C, 0.96 Bar, and 60% relative humidity may be the highest recorded adsorption capacity for an amine-grafted silica gel and may be higher than $CO_2$ adsorption capacities of amine-grafted SBA-15 adsorbents. When compared to Li-LSX, K-LSX, NaX and amine-grafted SBA-15, the breakthrough performance of W-AG-150A may be comparable under dry adsorption conditions and superior under wet adsorption conditions due to the positive influence of moisture on $CO_2$ adsorption capacity.

Based on the above, the importance of the difference between wet amine grafting and dry amine grafting on silica may be understood. Further, water may be more effective at regulating amine loading of silica supports than alcohol. While addition of alcohol may not result in higher amine loadings of the silica support, the addition of water may lead to higher amine loading. A further increase in water con-centration may result in a further increase in amine loading, without plateauing at higher water concentrations. Addition-ally, increasing the aminosilane content beyond 2 mL/g of $SiO_2$ during amine grafting may not yield higher amine loading of the silica gel. The presence of even small amounts of water during grafting increases the grafting rate of the aminosilanes as compared to dry grafting without water, resulting in near complete grafting of amines to supports in around 30 minutes. The stability of wet grafted materials may be found in other silanes (e.g., other than Triamine) and other mesoporous silica supports (e.g., KIT-6, MCM-48, and silica gels).

The effect of water may be shown based on silica supports prepared according to one or more of the above methods. In one example, SBA-15 may by synthesized by dissolving 8 grams of Pluronic P123 in 240 mL $H_2O$ and 40.1 mL of 37% HCl at room temperature (e.g. around 20-26 C). After the complete dissolution of Pluronic P123, the temperature may be increased to 35° C., after which 18.2 mL of TEOS may be added to the solution dropwise. The mixture may be stirred at 35° C. for 24 hours, followed by another 24 hours at 100° C. The resulting white solid may be collected by filtration, washed with water, and dried at 50° C. overnight. Subsequently, the product may be calcined at 550° C. for 6 hours under an air flow.

In another example, KIT-6 may be synthesized by dis-solving 4 grams of Pluronic P123 in 144 mL $H_2O$ and 6.63 mL of 37% HCl at room temperature (e.g. around 20-26 C). After the complete dissolution of Pluronic P123, the tem-perature may be increased to 40° C. and 4.94 mL of n-Butanol may be added and stirred for 1 hour. 9.14 mL of TEOS may be then added to the solution dropwise. The mixture may be stirred at 40° C. for 24 hours. The mixture may be put in a Teflon autoclave and hydrothermally treated for 24 hours at 100° C. under static conditions. The resulting white solid may be collected by filtration, washed with water, and dried at 50° C. overnight. Subsequently, the product may be calcined at 550° C. for 6 hours under an air flow.

In a further example, MCM-48 may be synthesized by mixing 5.2 grams of cetyltrimethylammonium bromide (CTAB), 240 mL of $H_2O$, and 100 ml of ethanol subse-quently stirring the mixture at room temperature (e.g. around 20-26 C). 24 mL of aqueous ammonia may be added to the mixture. 7.2 mL of TEOS may be subsequently added and the entire mixture stirred for 10 hours. The resulting white solid may be collected by filtration, washed with copious amounts of water, and dried at 50° C. overnight. Subse-quently, the product may be calcined at 550° C. for 6 hours under an air flow.

Following synthesis, the silica supports may be grafted under dry or wet conditions. In one example, dry grafting may be achieved by mixing 100 mL of anhydrous toluene with 10 mL N1-(3-Trimethoxysilylpropyl) diethylenetri-amine (Triamine) in an Erlenmeyer flask, and then adding 1 g of SBA-15. The mixture may be stirred and refluxed at 85° C. for 12 hours. The grafted silica may be filtered and washed with copious amounts of toluene, then dried in a 50° C. oven overnight. Amine-grafted adsorbents are designated as "AG-SBA-15-X-Y," where "X" refers to the amine con-centration (mL/g $SiO_2$) used during grafting, and Y refers to the grafting reaction time (hours) used for amine grafting. For example, AG-SBA-15-10-12 represents an SBA-15 adsorbent grafted under dry conditions (e.g. no water added during grafting) with an amine concentration of 10 mL/g $SiO_2$ and a grafting time of 12 hours.

In another example, wet grafting may be achieved by drying the silica supports at 100° C. overnight prior to amine grafting. Synthesis may proceed by adding a specific amount of $H_2O$ (e.g., 0.2-0.6 mL) dropwise to a solution containing 100 mL anhydrous toluene and 1 g of SBA-15. The mixture may be stirred at room temperature (e.g. around 20-26 C) for 5 minutes. Subsequently, 10 mL N$^1$-(3-Trimethoxysilylpro-pyl) diethylenetriamine or (3-Aminopropyl) trimethoxysi-lane (APTMS) may be added. The mixture may be stirred and refluxed at 85° C. for the predetermined amount of time. The grafted adsorbents may be filtered and washed with copious amounts of toluene, and dried in a 50° C. oven. This synthesis procedure may be applied to all supports. Wet grafted adsorbents are designated as "WG-SBA-15-X-Y-Z," where "X" refers to the amine concentration (mL/g $SiO_2$) used during grafting, "Y" refers to the grafting reaction time (hours) used for amine grafting, and "Z" refers to the amount of water (mL/g SiO$_2$) added during wet grafting. For example, WG-SBA-15-10-12-0.4 represents an SBA-15 adsorbent grafted under wet conditions with an amine concentration of 10 mL/g SiO$_2$, a grafting time of 12 hours, and water concentration of mL/g SiO$_2$.

For wet grafting with n-Butanol, 2 mL of n-Butanol may be added dropwise to a solution containing 100 mL anhydrous toluene and 1 g of SBA-15. The mixture may be stirred at room temperature (e.g. around 20-26 C) for 5 minutes. Subsequently, 10 mL N$^1$-(3-Trimethoxysilylpropyl) diethylenetriamine may be added. The mixture may be stirred and refluxed at 85° C. for 12 hours. The grafted adsorbents may be filtered and washed with copious amounts of toluene, then dried in a 50° C. oven. The n-Butanol grafted adsorbents are designated as "nBG-SBA-15-X-Y," where "X" refers to the amine concentration (mL/g SiO$_2$) used during grafting, and Y refers to the grafting reaction time (hours) used for amine grafting. For example, nBG-SBA-15-10-12 represents an SBA-15 adsorbent grafted under dry conditions (e.g. no water added during grafting) with an amine concentration of 10 mL/g SiO$_2$ and a grafting time of 12 hours. The conditions of grafting are summarized in Table 4 below.

TABLE 4

Summary of grafting conditions for different supports.

| Support | Amine Concentration [mL/g SiO$_2$] | Added Water [mL/g SiO$_2$] | Added n-Butanol [mL/g SiO$_2$] | Grafting Reaction Time [hours] |
|---|---|---|---|---|
| SBA-15 | 1-10 | 0-0.6 | — | 0.5, 3, and 12 |
| SBA-15 | 10 | — | 2.0 | 12 |
| KIT-6 | 10 | 0.4 | — | 3 and 12 |
| MCM-48 | 10 | 0.4 | — | 3 and 12 |

Figure 13:
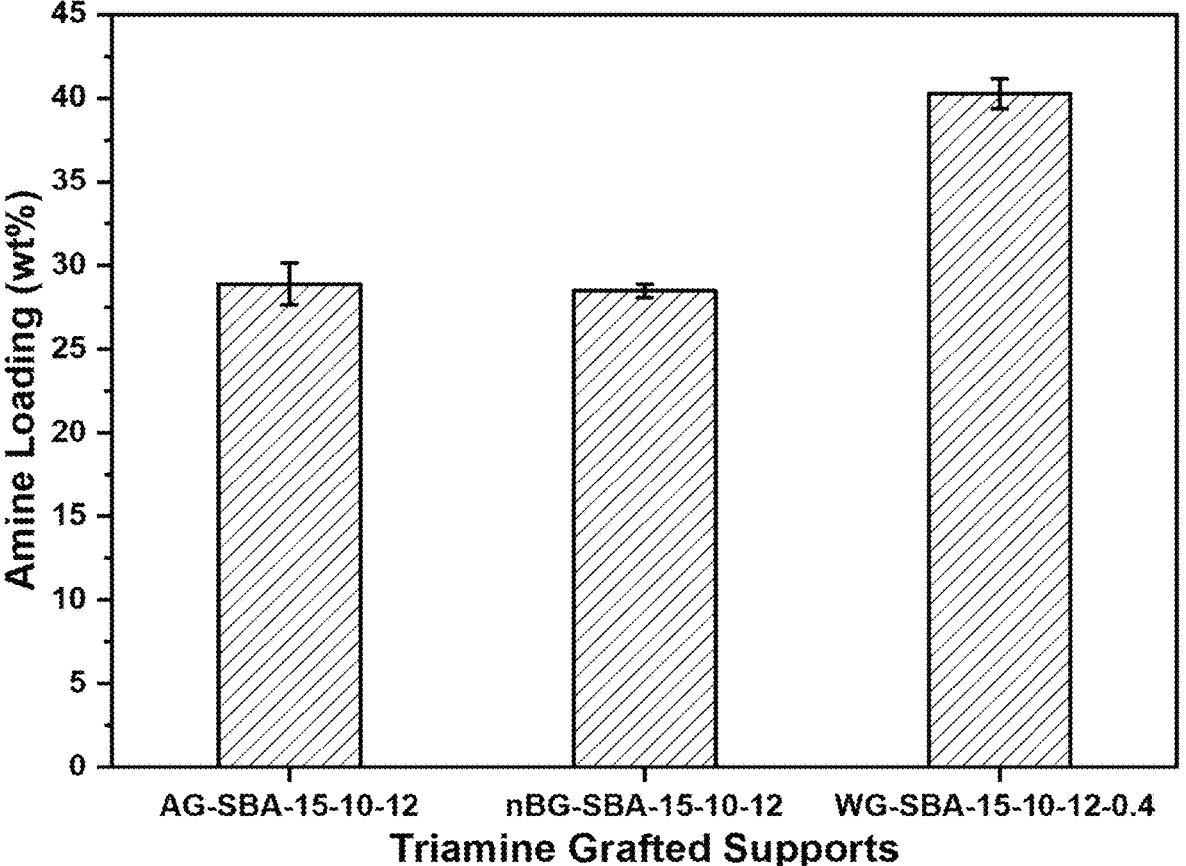
FIG. 13 is a graphical plot depicting amine loading of silica supports using water and alcohol.

FIG. 13 depicts a graphical plot depicting amine loading of silica supports. The amine loading is shown for dry grafted AG-SBA-15-10-12, wet grafted WG-SBA-15-10-12-0.4, and alcohol grafted nBG-SBA-15-10-12. In this way, the effect of wet grafting silica supports in the presence of water may be compared with dry grafted supports and wet grafted supports in the presence of alcohol. To this end, the amine loading of adsorbents grafted in the presence of 0.4 mL H$_2$O/g SiO$_2$ and adsorbents grafted in the presence of 2.0 mL n-Butanol/g SiO$_2$ are compared. 0.4 mL H$_2$O/g SiO$_2$ and 2 mL n-Butanol/g SiO$_2$ are used because they are molar equivalents. Additionally, n-Butanol was chosen as the alcohol due to its high boiling point compared to other alcohols. 85° C. may be an optimal temperature for attaining a significant amount of grafted silanes at least in part because n-Butanol possesses a boiling point above the optimal temperature.

To determine the amine loading of dry and wet grafted SBA-15 (silica support), the adsorbents are analyzed by TGA under air flow and the results are depicted in FIG. 13. Weight loss below 150° C. corresponds to the removal of adsorbed atmospheric CO$_2$ and water, and therefore is omitted. The decomposition of the majority of grafted amines may occur between 150-600° C. The amine loading for AG-SBA-15-10-12 under these conditions is 28.8%, compared to an increased loading of 40.5% for WG-SBA-15-10-12-0.4. The TGA results confirm the that presence of water influences the amount of grafted amines. However, for n-Butanol grafted SBA-15 the amine loading is lower than that of dry grafted SBA-15, indicating that the presence of n-Butanol does not result in more grafted amines. The lower amine loading in the presence of n-butanol may be attributed to the replacement of the ethoxy groups of N1-(3-Trimethoxysilylpropyl) diethylenetriamine with butoxy groups resulting in a less hydrolysable and reactive compound. While wet grafting with alcohols having less steric bulk than n-butanol, such as methanol, may result in higher amine loading, the lower boiling points of such alcohols and corresponding lower amine grafting temperatures for those alcohols may yield lower amine loadings overall. Further, wet grafting may require a greater amount of such alcohols compared to the amount of water used to produce an increased amine loading. Still further, the addition of water results in greater hydrolysis of the N1-(3-Trimethoxysilylpropyl) diethylenetriamine alkoxy groups. The water hydrolyzed aminosilanes are highly reactive compared to alcohol, resulting in higher amine loading of the silica supports.

Figure 14:
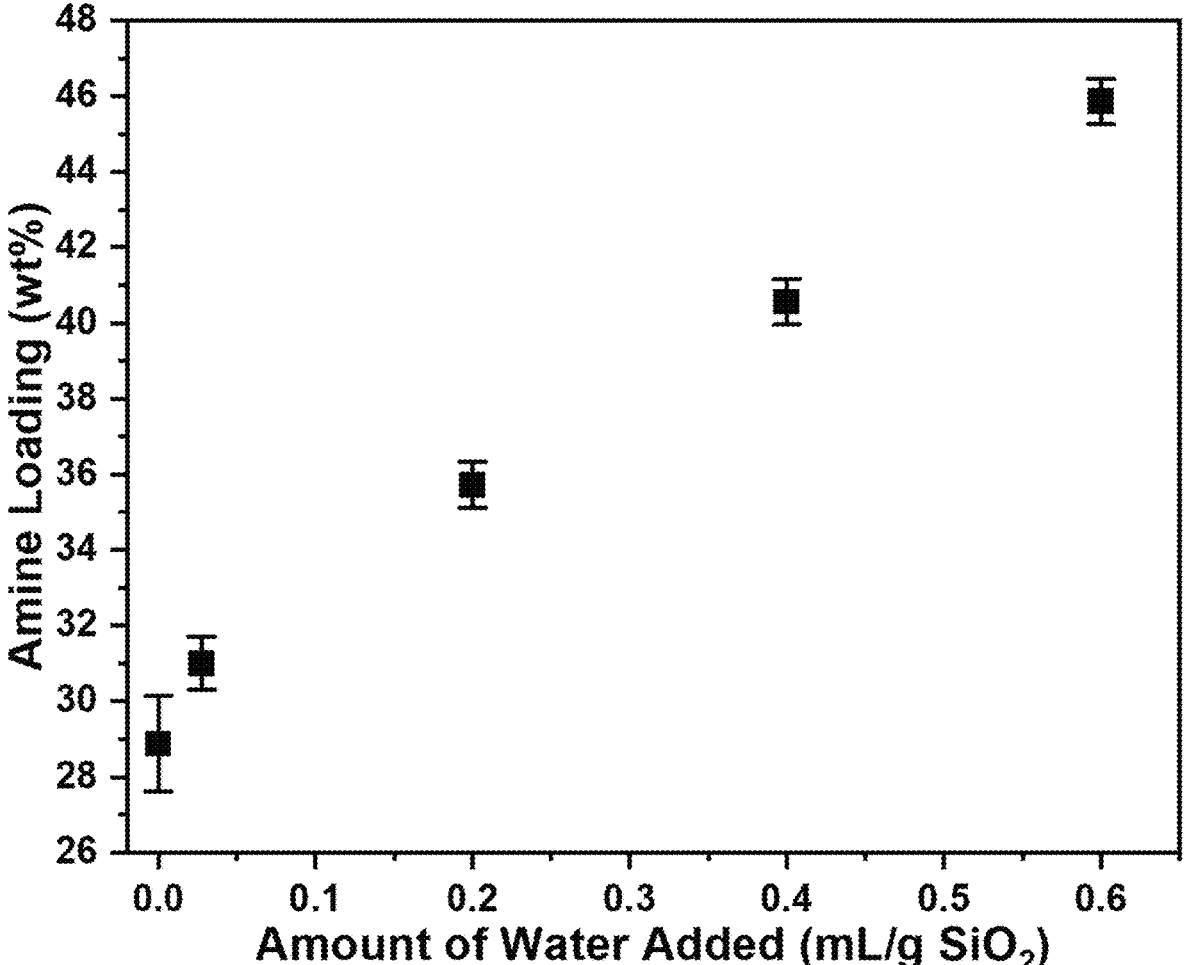
FIG. 14 is a graphical plot depicting amine loading of wet grafted and dry grafted silica supports.

FIG. 14 depicts a graphical plot depicting amine loading of wet grafted and dry grafted SBA-15 (silica support). The amine loading of SBA-15 (silica support) is shown using 10 mL/g SiO$_2$ Triamine and a grafting reaction time of 12 hours in each case for different amounts of water added to the silica gel during grafting. The additional of even small amounts of water during grafting results in increased amine loading of the silica supports.

Amine loading increases when increased amounts of water (>0.03 mL/g SiO$_2$) are added. The amine loading of SBA-15 increased from 28.8% for dry grafted AG-SBA-15-10-12 (e.g., 0 water added) to 45.8% for wet grafted WG-SBA-15-10-12-0.6. Notably, under these synthesis conditions, the amount of grafted amines increases with subsequent additions of water without any sign of the amine loading plateauing or leveling off. This increase in amine loading is due to the hydrolysis and condensation of alkoxy groups in the presence of water leading to the aminosilane polymerization. The amount of water present in the solution for alkoxy hydrolysis and condensation determines the degree of polymerization. This effect is further illustrated by changes in the textural properties of pristine (e.g., ungrafted) and wet grafted SBA-15 (silica support).

Figure 15:
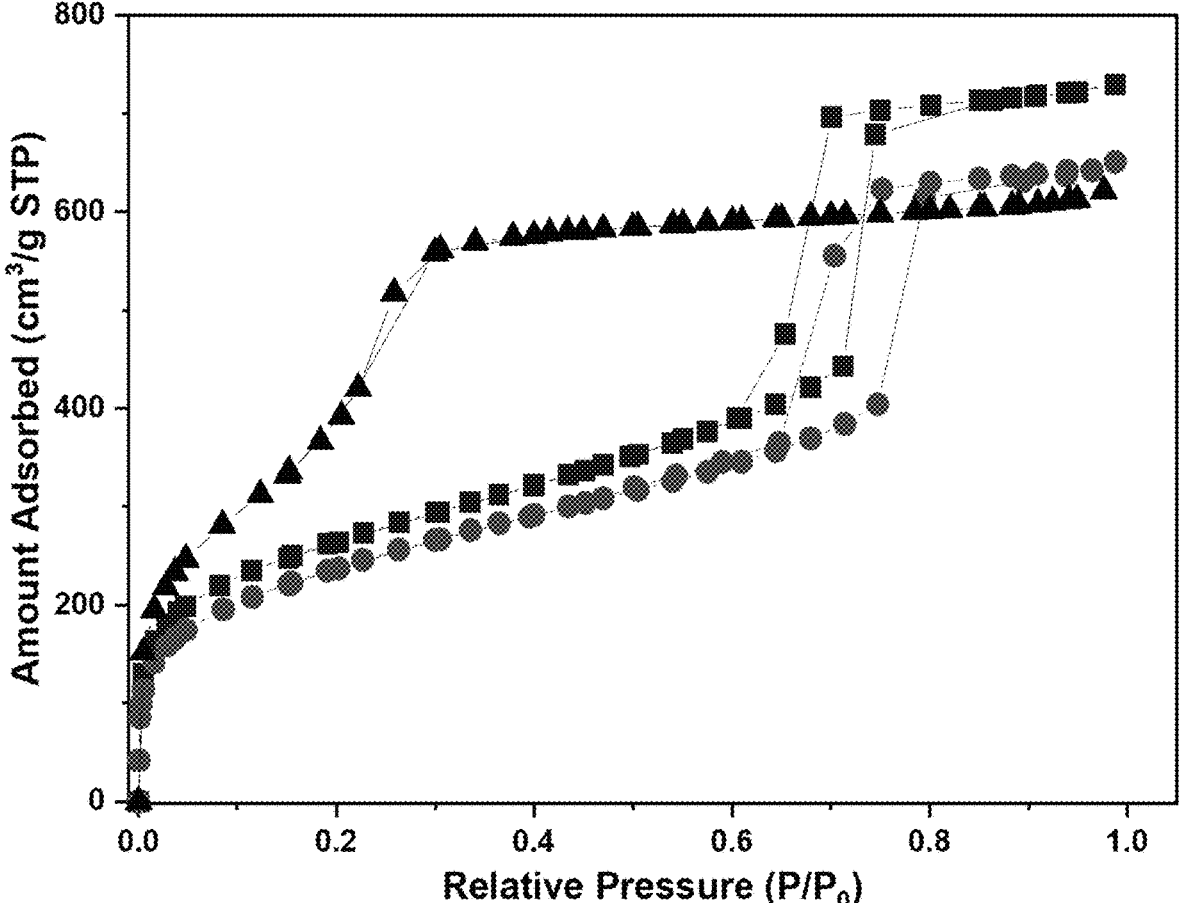
FIG. 15 is a graphical plot depicting nitrogen adsorption-desorption isotherms for different silica supports.

FIG. 15 depicts a graphical plot depicting nitrogen adsorption-desorption isotherms for different pristine (e.g., ungrafted) silica supports. The isotherms at −196° C. are shown for the calcinated silica supports, SBA-15 (square (■) data series), KIT-6 (circle (●) data series), and MCM-48 (triangle (▲) data series). the textural properties of the calcined supports, WG-SBA-15-10-12-0.03, WG-SBA-15-10-12-0.2, WG-SBA-15-10-12-0.4, and WG-SBA-15-10-12-0.6, are summarized in Table 5.

TABLE 5

Surface area and pore structure parameters of all prepared materials.

| Sample | BET Surface Area [m$^2$/g] | Pore Diameter [nm] | Total Pore Volume [cm$^3$/g] |
|---|---|---|---|
| SBA-15 | 956 | 7.87 | 1.13 |
| AG-SBA-15-10-12 | 168 | 6.39 | 0.276 |
| WG-SBA-15-10-12-0.03 | 107 | 5.65 | 0.174 |
| WG-SBA-15-10-12-0.2 | 12.1 | 5.65 | 0.0236 |
| WG-SBA-15-10-12-0.4 | 9.25 | 4.28 | 0.0104 |
| WG-SBA-15-10-12-0.6 | 9.7 | 3.10 | 0.00823 |
| KIT-6 | 856 | 8.54 | 1 |
| MCM-48 | 1754 | 2.08 | 0.961 |

Figure 16:
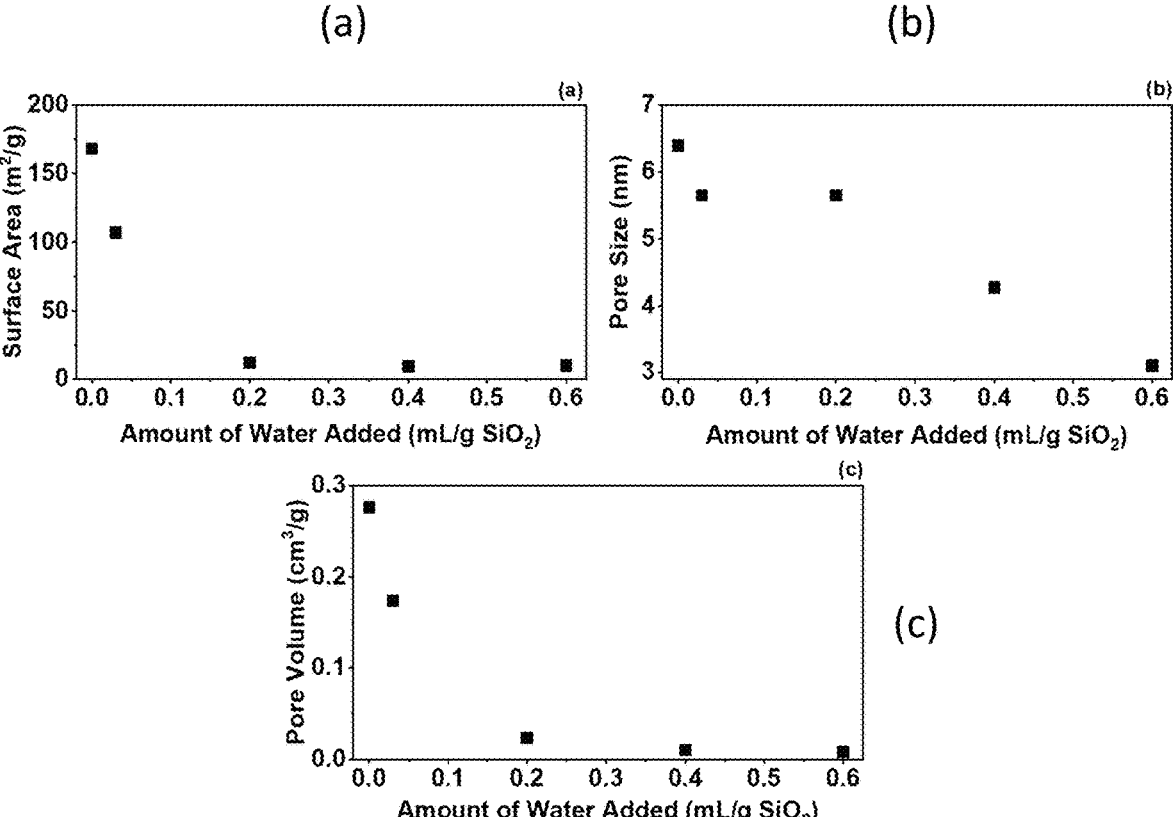
FIG. 16 is three graphical plots depicting pore properties for wet grafted silica supports.

FIG. 16 depicts graphical plots depicting pore properties for SBA-15 (silica support). The plots depict relative changes in the surface area (plot (a)), pore size (plot (b)), and pore volume (plot (c)) of wet grafted SBA-15 (silica support) compared to the amount of water added. In accordance with the $N^2$ isotherms, the surface area, pore size and pore volume exhibited marked decreases as the amount of added water during amine grafting increases. With increasing amounts of water added during grafting, the surface area, pore size and pore volume decreased by 88.8%, 28.2%, and 84.6% for wet grafted WG-SBA-15-10-12-0.03, 98.7%, 28.2%, and 97.9% for wet grafted WG-SBA-15-10-12-0.2, 99%, 45.6%, and 99% for wet grafted WG-SBA-15-10-12-0.4, and 99%, 60.6%, and 99.2% for wet grafted WG-SBA-15-10-12-0.6 compared to 82.4%, 18.8%, 75.5% for dry grafted AG-SBA-15-10-12. The decrease in surface area, pore size, and pore volume indicates that the continuous addition of water during grafting leads to higher amine polymerization and a pore blocking effect. In the pore space, water initiates the hydrolysis and condensation reactions of the alkoxy groups while the aminosilane grafts to the surface hydroxyl groups.

Higher water concentrations in the pore results in higher agglomeration of the amine moieties. The increased agglomeration of amines renders the pores inaccessible for nitrogen molecules, thus resulting in near negligible surface area, pore size and pore volume values for wet grafted SBA-15 (silica support). During wet grafting, water concentrations above 0.6 mL/g result in a balling and agglomeration of SBA-15. The balling and agglomeration may be caused by inter-particle polymerization of amines after the pore are filled.

Pore blocking behavior may be found in other materials. For example, wet impregnated silica adsorbents using polymers like polyethyleneimine (PEI) demonstrate pore blocking behavior. PEI polymers are densely packed in the pore channels of silica supports and further loading of PEI leads to the plugging of the pores. The $CO_2$ adsorption capacities of these PEI impregnated silica adsorbents achieve their highest capacity within the adsorption temperature range of about 50-100° C. At higher adsorption temperatures, polymeric amines become more mobile, facilitating the transport of $CO_2$ into the bulk of amines in the pores.

The polymeric behavior of wet grafted amines is confirmed by measuring $CO_2$ adsorption capacity and rates for wet grafted SBA-15 (silica support) and comparing the behavior to PEI polymers.

Figure 17:
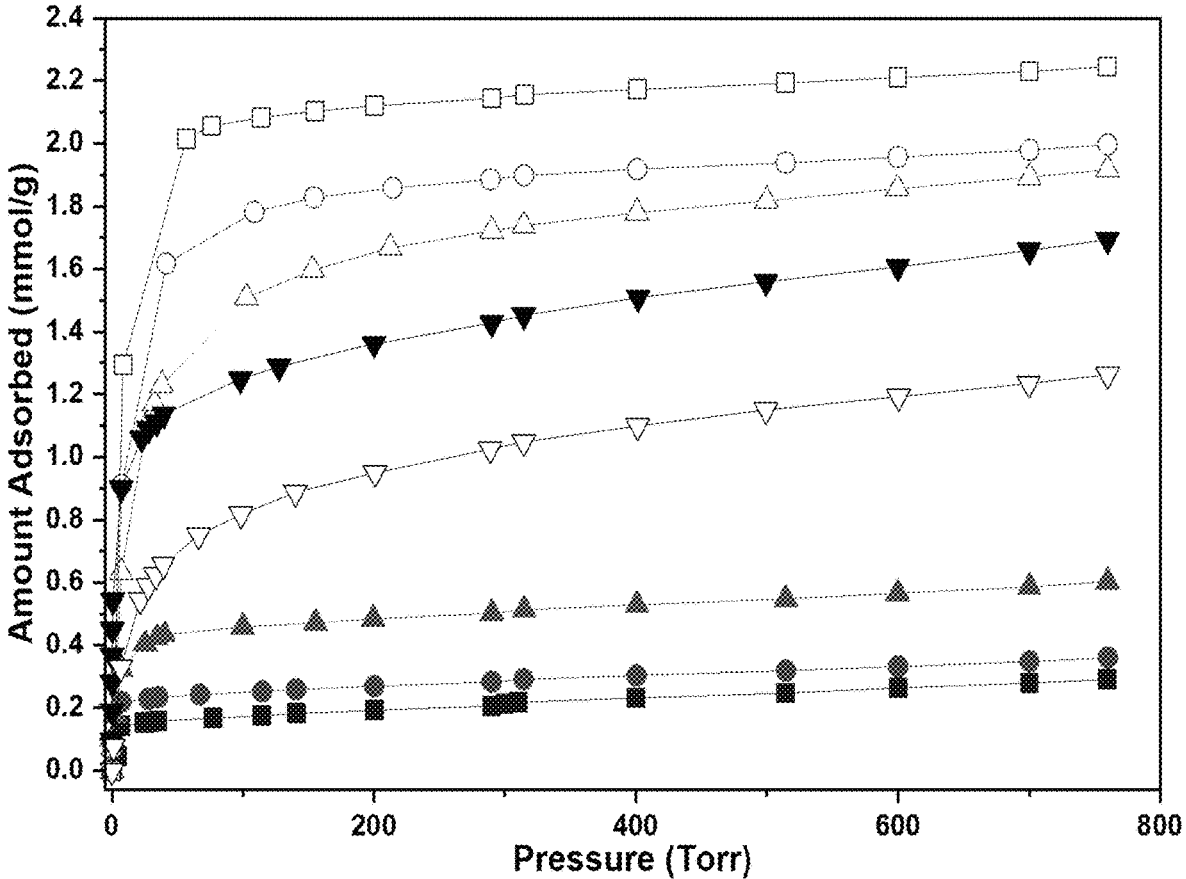
FIG. 17 is a graphical plot depicting carbon dioxide adsorption isotherms for an amine-grafted silica support.

FIG. 17 depicts a graphical plot depicting carbon dioxide adsorption isotherms for amine-grafted SBA-15 (silica support). The carbon dioxide isotherms at 25° C. are shown for AG-SBA-15-10-12 (filled downward triangle (▼) data series), WG-SBA-15-10-12-0.2 (filled upward triangle (▲) data series), WG-SBA-15-10-12-0.4 (filled circle (●) data series), and WG-SBA-15-10-12-0.6 (filled square (■) data series). Additionally, carbon dioxide isotherms at 75° C. are shown for AG-SBA-15-10-12 (open downward triangle (▽) data series), WG-SBA-15-10-12-0.2 (open upward triangle (△) data series), WG-SBA-15-10-12-0.4 (open circle (○) data series), and WG-SBA-15-10-12-0.6 (open square (□) data series). The isotherms are measured using a Micromeritics ASAP 2020 Analyzer. All samples were degassed at 105° C. overnight prior to all measurements. Thermogravimetric analysis was carried out on a Shimadzu TGA-50H. Amine loading analysis was performed by pretreating the sample under a helium flow for 2 hours at 100° C., then heating to 850° C. at a heating rate of 5° C./min under a helium and airflow. Adsorption rates measurements were performed using a TGA under a dry 70% $CO_2$ flow (in He) at 25° C. and 75° C. Multi-cycle stability studies were examined using a TGA under a dry 70% $CO_2$ flow (in He) at 75° C. The sample was desorbed at 90° C. in He after each adsorption cycle.

At 25° C., the $CO_2$ adsorption capacity for AG-SBA-15-10-12 is 1.69 mmol/g and, with wet grafting, the $CO_2$ adsorption capacity decreases significantly. The adsorption capacity decreased from 0.604 mmol/g for WG-SBA-15-10-12-0.2, to 0.358 mmol/g for WG-SBA-15-10-12-0.4 and 0.290 mmol/g for WG-SBA-15-10-12-0.6. A declining trend in adsorption capacity indicates that the increased amine loading (e.g. due to higher amounts of water addition) limits the diffusion of $CO_2$ and reduces the quantity of accessible amines for $CO_2$ adsorption.

However, at 75° C., the $CO_2$ adsorption capacity increases as the water concentration increases. The adsorption capacity is 1.26 mmol/g for AG-SBA-15-10-12, 1.91 mmol/g for WG-SBA-15-10-12-0.2, 1.99 mmol/g for WG-SBA-15-10-12-0.4 and 2.24 mmol/g for WG-SBA-15-10-12-0.6. Due to the exothermic nature of adsorption, dry grafted AG-SBA-15 achieved a lower $CO_2$ adsorption capacity at 75° C. The rising trend in adsorption capacity for wet grafted SBA-15 indicates that higher temperatures render the polymer-like amines more mobile, thereby increasing the quantity of accessible amines.

Beyond $CO_2$ adsorption capacity, the polymerization effect caused by the addition of water during wet grafting has additional effects on uptake rates in the silica supports during $CO_2$ adsorption. Uptake rates may be expressed as a diffusion time constant (D/R2, where D is pore diffusivity and R is the radius of the particle). Gravimetric adsorption measurements may be used to calculate diffusion time constants for silica supports. The diffusion time constants are shown in Table 6. The adsorption rate decreased in the following order: AG-SBA-15-10-12>WG-SBA-15-10-12-0.2>WG-SBA-15-10-12-0.4>WG-SBA-15-10-12-0.6.

TABLE 6

| Diffusion Time Constants (D/R2) for dry and wet grafted SBA-15 silica supports at 75° C. | |
| --- | --- |
| Sample | $D/R^2$ (1 × $10^{-5}$), s$^{-1}$ |
| AG-SBA-15-10-12 | 110 |
| WG-SBA-15-10-12-0.2 | 7.05 |
| WG-SBA-15-10-12-0.4 | 4.9 |
| WG-SBA-15-10-12-0.6 | 3.6 |

While the addition of water increases the level of grafted amines on the silica supports (e.g. due to higher polymerization on the silica supports) the increased grafting may also result in higher diffusional resistances. As shown in the pore properties of Table 5, silica supports with higher amine loadings have lower pore size and pore volume, which increased the diffusion barrier of $CO_2$ and thereby reduced the diffusion time constant. While WG-SBA-15-10-12-0.6 had the highest equilibrium $CO_2$ adsorption capacity (2.24 mmol/g), the silica support also achieved the lowest uptake rates, as shown in Table 6. The high adsorption capacity and low uptake rate results from the polymerization (e.g. the formation of densely polymerized amine moieties in the pores of the silica supports) caused by the water introduced during wet amine grafting and the corresponding reduction in pore size and volume. The overall effect of the polymerization is higher $CO_2$ adsorption capacities but at a slower uptake rate (and additional exposure time to reach the higher capacity) for the silica supports.

Additionally, the effect of water on wet grafting of silica supports may be shown by varying the amount of water added, the aminosilane concentration, and the amine grafting time. Thermal analysis may be used to measure the effects of water on wet grafting.

Figure 18:
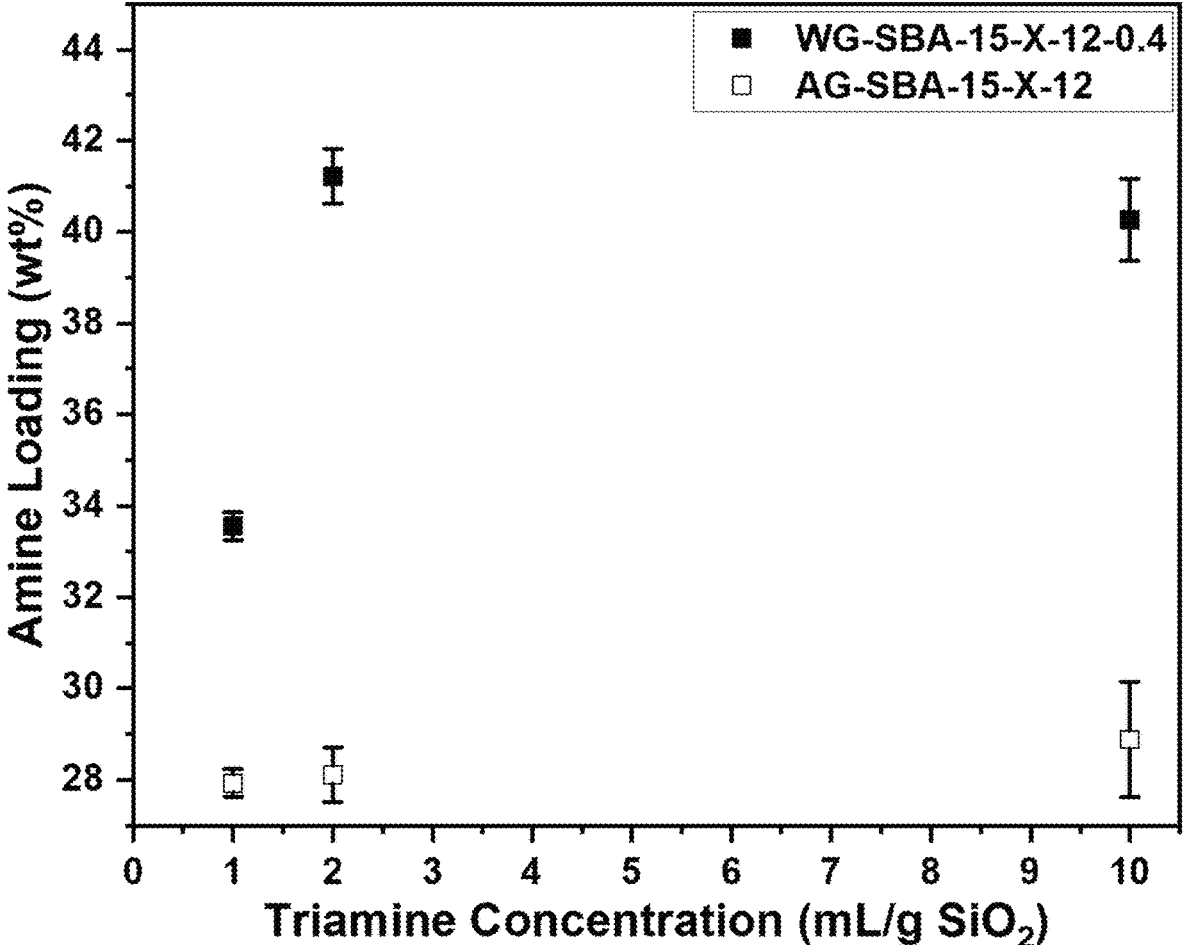
FIG. 18 is a graphical plot depicting amine loading as a function of amine concentration of silica supports.

FIG. 18 depicts a graphical plot depicting amine loading as a function of amine concentration of AG-SBA-15-X-12 and WG-SBA-15-X-12-0.4 (silica supports). The open square (□) data series represents the amine loading of AG-SBA-15-X-12. The filled square (■) data series represents the amine loading of WG-SBA-15-X-12-0.4. In this example, at an amine grafting temperature of 85° C., the water concentration was kept constant at 0.4 mL/g $SiO_2$, while the aminosilane concentration was varied.

Based on the results depicted in FIG. 18, it may be understood that the amine loading of wet grafted WG-SBA-15-X-12-0.4 is not significantly affected by concentrations of aminosilane greater than 2 mL/g $SiO_2$ during wet grafting. However, at lower concentrations of aminosilane (e.g. below 1 mL/g $SiO_2$ the amine loading is reduced by about 19%. This reduction in amine loading was not observed for dry grafted AG-SBA-15-1-12. The deviation in amine loading at low concentrations of aminosilane between wet grafted WG-SBA-15-1-12-0.4 and AG-SBA-15-1-12 is due to the amine loading being dependent on the addition of sufficient amounts of aminosilane. For WG-SBA-15-1-12-0.4, when the silane concentration is low (e.g., below 2 mL/g $SiO_2$), the added water is not completely consumed and when the aminosilane concentration is high (e.g., greater than or equal to 2 mL/g $SiO_2$), the added water is more completely consumed by the unreacted alkoxy groups, leading to higher amine loadings.

Dry grafting (without water and the concurrent effects on pore size, amine loading, and $CO_2$ uptake), in contrast, is constrained by the availability of surface silanol groups for covalent tethering with the aminosilanes. Thus, further addition of aminosilanes into the solution, thereby increasing aminosilane concentration during grafting, may not result in greater amounts of grafted amines unless the silanol group density is increased.

Figure 19:
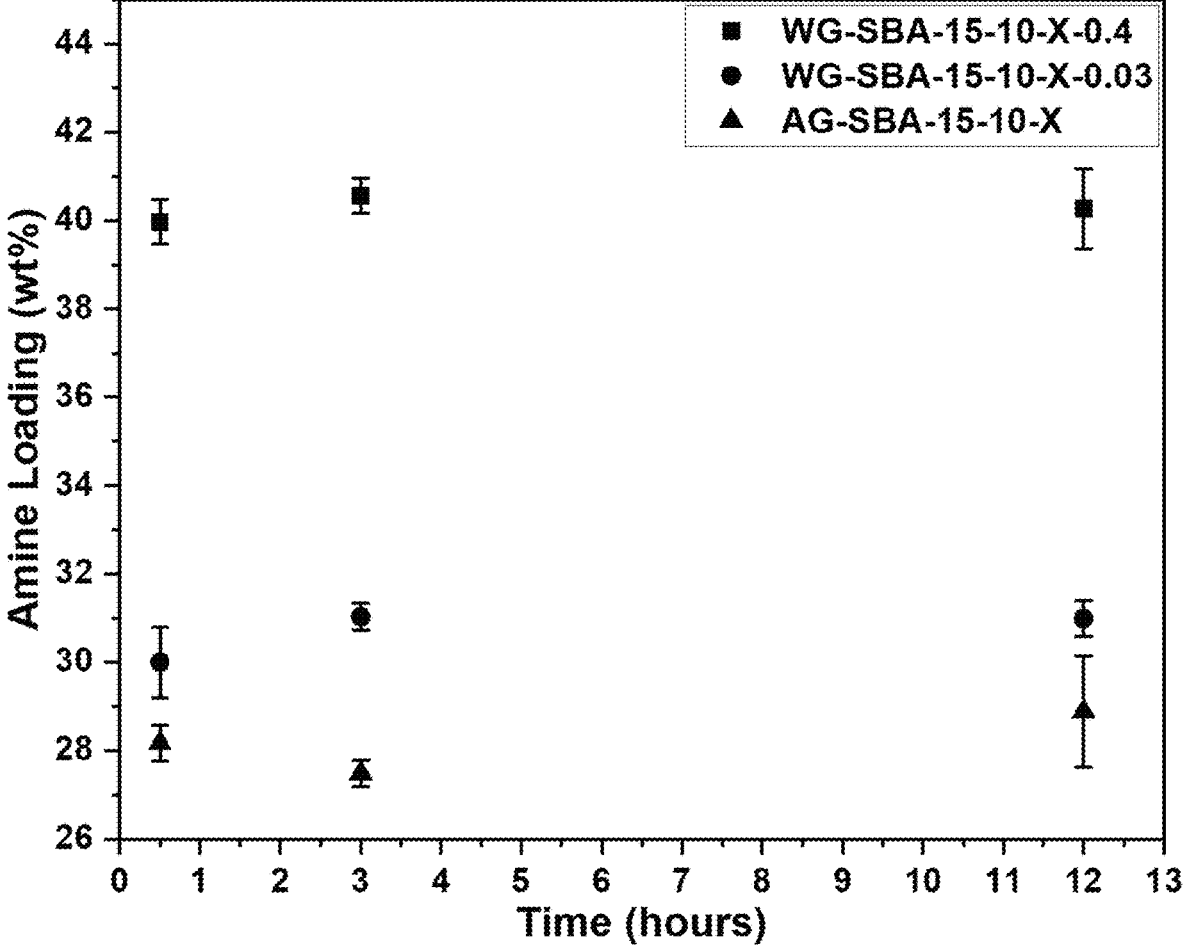
FIG. 19 is a graphical plot depicting amine loading as a function of amine grafting time of silica supports.

FIG. 19 depicts a graphical plot depicting amine loading as a function of amine grafting reaction time of silica supports. The amine loading is shown for AG-SBA-15-10-X, WG-SBA-15-10-X-0.03, and WG-SBA-15-10-X-0.4 The plot depicts the effect of water concentration during wet grafting on the amine grafting reaction time. The grafting temperature and water concentration were kept constant at 85° C. and 0.4 mL/g $SiO_2$, respectively. However, the grafting reaction time for dry grafted and wet grafted SBA-15 were varied.

As discussed above, at least with respect to FIG. 16, the polymerization effect caused by the addition of water reduced pore size and volume. As this effect starts and increases over the course of wet grafting, reaction times, in general, may be extended for silica supports to reach the overall higher amine loading afforded by wet grafting with water as compared to dry grafting.

As shown in FIG. 19, the amine loading for dry grafted AG-SBA-15-10-X is 28.1% after 30 minutes, 27.4% after 3 hours, and 28.8% after 12 hours. The amine loading stays relatively constant as the grafting reaction time increases, meaning the surface hydroxyl groups are consumed and further amine grafting is not possible. For wet grafted WG-SBA-15-10-X-0.4, the amine loading is essentially unchanged from 30 minutes to 12 hours. Because the water concentration affects grafting rate, the effect may be shown by varying the water concentration, for example, from 0.03 mL/g $SiO_2$ (e.g., 1 drop) to 0.4 mL/g $SiO_2$.

The results presented in FIG. 19 show that the grafting rate is affected by the mere addition of water, even in small amounts. While the grafting reaction time has little effect on the amine loading for dry grafted SBA-15, the adsorbed moisture during amine grafting influences the grafting rate due to the reactivity of silanol functional groups formed on the supports. For grafting in the presence of water, the aminosilane alkoxy groups are transformed into highly reactive silanol functional groups. These highly reactive silanol functional groups of the aminosilanes and on the support, condense rapidly to form Si—O—Si (siloxane) linkages, or bridges, thereby interconnecting the silanes. In contrast, for amine grafting in 100% dry conditions, the condensation reaction occurring between the unhydrolyzed alkoxy groups of aminosilanes and silanol functional groups of the support is slower and also results in lower overall amounts of grafted amines (due to the absence of the polymerized siloxane linkages).

Figure 20:
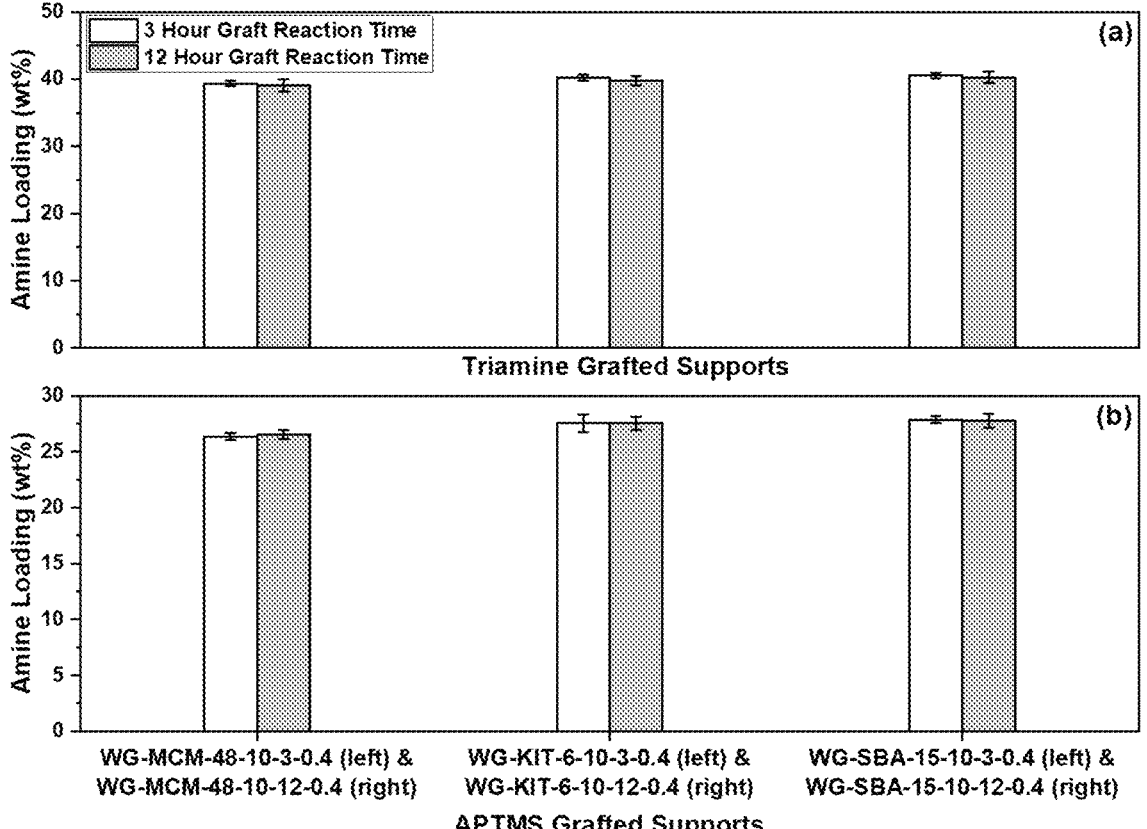
FIG. 20 is two graphical plots depicting amine loading at different amine grafting times of different wet grafted silica supports.

FIG. 20 depicts two graphical plot depicting amine loading at different amine grafting times of different wet grafted silica supports. The (a) plot depicts the amine loading of wet grafted (using a mixture of Triamine and water) MCM-48, KIT-6, and SBA-15, using 3 hour and 12 hour grafting reaction times. Additionally, the (b) plot depicts the amine loading of wet grafted (using a mixture of water and APTMS) MCM-48, KIT-6, and SBA-15 (b) using 3 and 12 grafting reaction times. For all supports, a specific amount of water (0.4 mL/g $SiO_2$) and amine (10 mL/g $SiO_2$) was used during the grafting process.

The effect of water increasing the amount of grafted aminosilanes applies not only to the grafting of SBA-15, but also for grafting other supports (e.g., MCM-48, KIT-6, and silica gels). In other words, the effect of water is nearly independent of the support used for amine grafting. Additionally, the results depicted in FIG. 20 show that the amine loading for all adsorbents at grafting reaction times of 3 and 12 hours show only a small variation for each respective support.

For wet grafting with APTMS, a specific amount of water (0.4 mL/g $SiO_2$) was used and the grafting reaction times are 3 and 12 hours. The amine loading for SBA-15, KIT-6, and MCM-48 (silica supports) at 3 hours and 12 hours with APTMS show only a small variation for each respective support. However, the amine loading of SBA-15, KIT-6, and MCM-48 showed is different with the same grafting conditions but with different aminosilanes, Triamine and APTMS. APTMS has a single available amine group, while Triamine has three available amine groups. The higher number of available amine groups results in increased amine loading on the supports as compared to grafting with lower numbers of available amine groups. Other amines beyond APTMS and Triamine may be used for grafting, such as diamine or sterically hindered amines.

There is little correlation between amine loading and surface area, pore size, or pore volume of the corresponding supports. While KIT-6 and MCM-48 possess similar bicontinuous 3D cubic structures, the supports have different textural properties. While the amine grafting reaction is affected by the surface geometry of the support (e.g., by the differing amounts of available silanol groups on each respective support affecting the amount of grafted amines), the results in FIG. 20 show similar amounts of amine grafting for supports with different surface geometries. In this way, the addition of water during wet grafting has similar effects under consistent grafting conditions whether MCM-48, KIT-6, or SBA-15 are used as the support.

Figure 21:
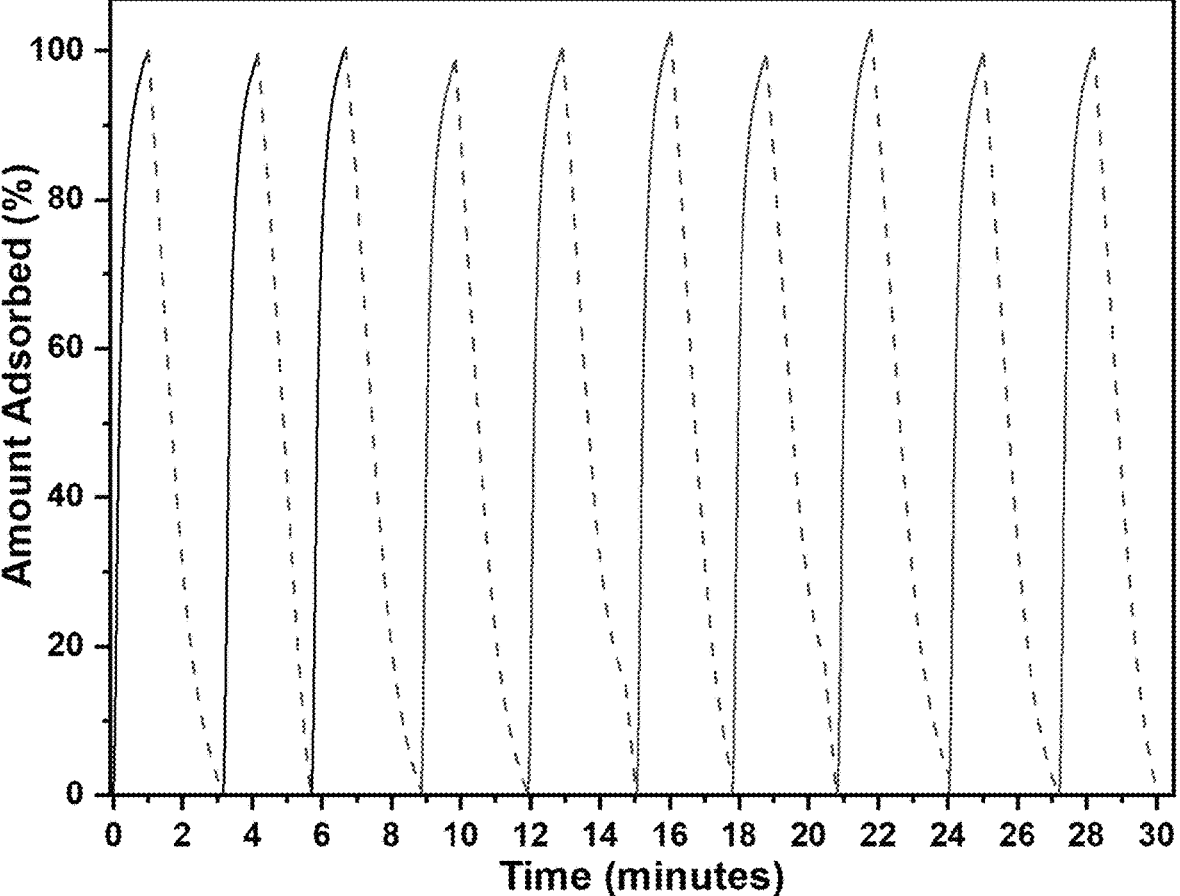
FIG. 21 is a graphical plot depicting carbon dioxide adsorption-desorption cycles for wet grafted silica supports.

FIG. 21 depicts a graphical plot depicting carbon dioxide adsorption-desorption cycles for a wet grafted silica support. The solid lines represent successive adsorption curves of wet-grafted WG-SBA-15-10-0.5-0.03 at 75° C. and 1 bar in the presence of 70% $CO_2$ in He flow. The dashed lines represent successive desorption (e.g., regeneration) curves of wet-grafted WG-SBA-15-10-0.5-0.03 at 90° C. and 1 bar in the presence of He flow in between the adsorption measurements. Full regeneration of WG-SBA-15-10-0.5-0.03 took about 3 minutes. Ten adsorption-desorption cycles of WG-SBA-15-10-0.5-0.03 are depicted in FIG. 21.

The plot depicted in FIG. 21 shows that there is no significant loss in adsorption capacity of the support after 10 cycles, thereby indicating that the adsorbent is stable after multiple adsorption-desorption cycles. The observed stability of WG-SBA-15-10-0.5-0.03 shows that the effects associated with grafting in the presence of water do not negatively affect the adsorption capacity and cyclic stability of grafted amines.

As may be understood from the plot depicted in FIG. 21, WG-SBA-15-10-0.5-0.03 exhibits a consistent adsorption capacity over multiple adsorption-desorption cycles. The stability of an adsorbent over multiple adsorption-desorption cycles may influence the suitability of the adsorbent for $CO_2$ capture. For example, adsorbents that retain their capacity for $CO_2$ adsorption over multiple cycles may be make large scale $CO_2$ sequestration more economical.

As discussed above, at least with respect to FIG. 16, PEI polymers are deposited within the pore or the external surface of silica supports and held by weak physical forces. The absence of covalent bonding between the support and the PEI polymers causes PEI functionalized adsorbents to have decreased multi-cycle stability. The decreased $CO_2$ adsorption capacity of PEI impregnated adsorbents is caused by the degradation and leaching of amines that is more prevalent due to the absence of stronger covalent bonds.

Conversely, the polymer-like amines observed in wet grafted adsorbent are produced, in part, by the covalent bonding between the amines and the supports, and between multiple amines. Under dry adsorption conditions and repeated cycles (e.g., >100 adsorption-desorption cycles), the stability and adsorption capacity of amine-functionalized adsorbents declines. Each successive adsorption-desorption cycle at high temperatures causes the formation of stable urea groups on the support that deactivate the functionalized amines that help the support sequester $CO_2$. The formation of urea groups, however, is inhibited when $CO_2$ adsorption is carried out in wet conditions (such as humidity in the effluent stream with the $CO_2$ or a layer of water on the adsorbent). For example, amine grafted MCM-41 exposed to $CO_2$ in wet conditions (0.4% R.H., 70° C.), exhibits a negligible loss in the $CO_2$ adsorption capacity (examined over 700 adsorption-desorption cycles). A similar reduction in the formation of urea groups (and associated maintenance of the adsorption capacity of the support) under wet adsorption may be found for other amine-functionalized silica, such as SBA-15, KIT-6, and silica gels.

FIG. 22 is a graphical plot depicting amine loading at different temperatures of wet grafted silica supports. A silica support (WG-SBA-15-10-3-0.2) was grafted with water and using different amine grafting temperatures.

Figure 23:
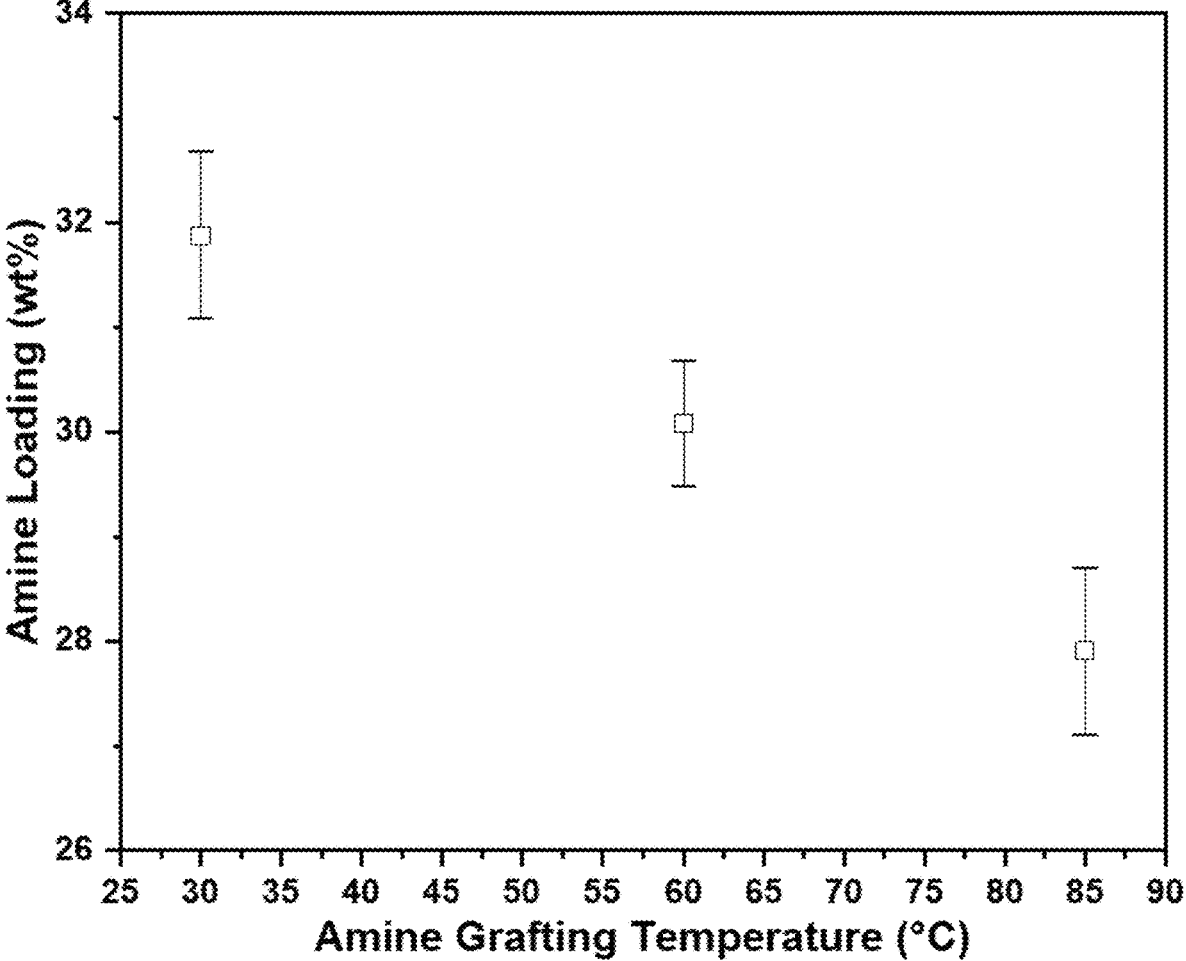
FIG. 23 is a graphical plot depicting amine loading at different amine grafting temperatures of wet grafted silica gels.

FIG. 23 is a graphical plot depicting amine loading at different temperatures of wet grafted silica supports. A silica support (WG-150A-10-3-0.2) was grafted with water and using different amine grafting temperatures.

The $CO_2$ adsorption capacity of the silica supports grafted at room temperature (e.g. around 20-26 C), as shown in FIGS. 22 and 23, were roughly similar to the those grafted at higher grafting temperatures.

The terms "around" and "about" are used herein to mean a 20% variance above or below the associated value, unless indicated otherwise. For example, "around 100 units" and "about 100 units" may be interpreted as "100 units±20 units."

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A method of grafting a silica support, the method comprising:

adding the silica support to a solvent, resulting in a first solution, the silica support having a plurality of pores;

adding an amount of water and an amount of silane to the first solution, resulting in a second solution;

after a grafting reaction time in which the silane is grafted to the silica support from 30 minutes to 3 hours at room temperature, filtering grafted silica support from the second solution; and drying the grafted silica support.

2. The method of claim 1, wherein the silane is $N^1$-(3-Trimethoxysilylpropyl) diethylenetriamine having a chemical formula of $(CH_3O)_3Si(CH_2)_3 NHCH_2CH_2NHCH_2CH_2NH_2$.

3. The method of claim 1, wherein the amount of silane added to the first solution is greater than the amount of water added to the first solution.

4. The method of claim 3, wherein the amount of silane is more than 33 times by volume greater than the amount of water.

5. The method of claim 3, wherein the amount of silane is more than 300 times by volume greater than the amount of water.

6. The method of claim 1, further comprising:

washing the grafted silica support with toluene.

7. The method of claim 1, wherein the amount of silane is added to the first solution at 20 degrees Celsius to 26 degrees Celsius.

8. The method of claim 1, wherein drying the grafted silica support comprises drying the grafted silica support at between 40 degrees Celsius and 60 degrees Celsius.

9. The method of claim 1, further comprising adding an amount of an alcohol to the first solution.

10. The method of claim 9, wherein the alcohol is n-Butanol.

11. The method of claim 9, wherein the alcohol is ethanol.

12. The method of claim 9, wherein the alcohol is methanol.

\* \* \* \* \*